United States Patent
Saito et al.

(10) Patent No.: US 9,460,124 B2
(45) Date of Patent: Oct. 4, 2016

(54) IMAGE PROCESSOR AND METHOD FOR MEMORY ACCESS CONTROL

(71) Applicant: MegaChips Corporation, Osaka (JP)

(72) Inventors: Kazuhiro Saito, Osaka (JP); Akira Okamoto, Osaka (JP)

(73) Assignee: MegaChips Corporation, Osaka-shi (JP)

(*) Notice: Subject to any disclaimer, the term of this patent is extended or adjusted under 35 U.S.C. 154(b) by 2 days.

(21) Appl. No.: 14/369,310

(22) PCT Filed: Nov. 30, 2012

(86) PCT No.: PCT/JP2012/081113
§ 371 (c)(1),
(2) Date: Jun. 27, 2014

(87) PCT Pub. No.: WO2013/099518
PCT Pub. Date: Jul. 4, 2013

(65) Prior Publication Data
US 2015/0016750 A1    Jan. 15, 2015

(30) Foreign Application Priority Data
Dec. 27, 2011  (JP) .................................. 2011-285524

(51) Int. Cl.
G06K 9/54        (2006.01)
G06F 17/30       (2006.01)
H04N 19/423      (2014.01)

(52) U.S. Cl.
CPC ........ *G06F 17/3028* (2013.01); *H04N 19/423* (2014.11)

(58) Field of Classification Search
None
See application file for complete search history.

(56) References Cited

U.S. PATENT DOCUMENTS

| | | | |
|---|---|---|---|
| 5,615,355 A * | 3/1997 | Wagner | G06F 13/1647 711/105 |
| 5,815,168 A * | 9/1998 | May | G09G 5/39 345/562 |
| 6,212,231 B1 | 4/2001 | Takano | |
| 7,979,622 B2 | 7/2011 | Okamoto | |
| 2005/0129129 A1* | 6/2005 | Winger | H04N 19/16 375/240.24 |
| 2009/0132759 A1* | 5/2009 | Kimura | G06F 12/0859 711/105 |

FOREIGN PATENT DOCUMENTS

| | | |
|---|---|---|
| JP | 8-186826 | 7/1996 |
| JP | 10-191236 | 7/1998 |
| WO | WO 2006/129518 A1 | 12/2006 |

OTHER PUBLICATIONS

International Search Report issued Mar. 12, 2013, in PCT/JP12/081113 filed Nov. 30, 2012.

* cited by examiner

*Primary Examiner* — Eueng-Nan Yeh
(74) *Attorney, Agent, or Firm* — Oblon, McClelland, Maier & Neustadt, L.L.P.

(57) ABSTRACT

An image processor includes a memory including multiple memory banks each having multiple unit storage areas and holding an image, an image processing unit that processes an image, and an access controller that controls an access from the image processing unit to the memory. In storing the image in the memory, the access controller splits the image in multiple groups of unit pixel data pieces including pixel data of multiple columns by multiple rows, and stores groups of unit pixel data pieces aligned in at least two columns in a pixel space in the same unit storage area in the same memory bank.

14 Claims, 21 Drawing Sheets

FIG. 3

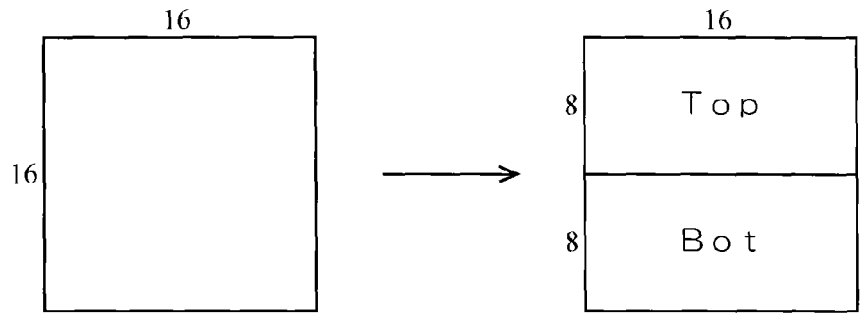

FIG. 4

| Y00 | Y01 | Y02 | Y03 | Y04 | Y05 | Y06 | Y07 | Y08 | Y09 | Y0a | Y0b | Y0c | Y0d | Y0e | Y0f |
|---|---|---|---|---|---|---|---|---|---|---|---|---|---|---|---|
| Y10 | Y11 | Y12 | Y13 | Y14 | Y15 | Y16 | Y17 | Y18 | Y19 | Y1a | Y1b | Y1c | Y1d | Y1e | Y1f |
| Y20 | Y21 | Y22 | Y23 | Y24 | Y25 | Y26 | Y27 | Y28 | Y29 | Y2a | Y2b | Y2c | Y2d | Y2e | Y2f |
| Y30 | Y31 | Y32 | Y33 | Y34 | Y35 | Y36 | Y37 | Y38 | Y39 | Y3a | Y3b | Y3c | Y3d | Y3e | Y3f |
| Y40 | Y41 | Y42 | Y43 | Y44 | Y45 | Y46 | Y47 | Y48 | Y49 | Y4a | Y4b | Y4c | Y4d | Y4e | Y4f |
| Y50 | Y51 | Y52 | Y53 | Y54 | Y55 | Y56 | Y57 | Y58 | Y59 | Y5a | Y5b | Y5c | Y5d | Y5e | Y5f |
| Y60 | Y61 | Y62 | Y63 | Y64 | Y65 | Y66 | Y67 | Y68 | Y69 | Y6a | Y6b | Y6c | Y6d | Y6e | Y6f |
| Y70 | Y71 | Y72 | Y73 | Y74 | Y75 | Y76 | Y77 | Y78 | Y79 | Y7a | Y7b | Y7c | Y7d | Y7e | Y7f |
| Y80 | Y81 | Y82 | Y83 | Y84 | Y85 | Y86 | Y87 | Y88 | Y89 | Y8a | Y8b | Y8c | Y8d | Y8e | Y8f |
| Y90 | Y91 | Y92 | Y93 | Y94 | Y95 | Y96 | Y97 | Y98 | Y99 | Y9a | Y9b | Y9c | Y9d | Y9e | Y9f |
| Ya0 | Ya1 | Ya2 | Ya3 | Ya4 | Ya5 | Ya6 | Ya7 | Ya8 | Ya9 | Yaa | Yab | Yac | Yad | Yae | Yaf |
| Yb0 | Yb1 | Yb2 | Yb3 | Yb4 | Yb5 | Yb6 | Yb7 | Yb8 | Yb9 | Yba | Ybb | Ybc | Ybd | Ybe | Ybf |
| Yc0 | Yc1 | Yc2 | Yc3 | Yc4 | Yc5 | Yc6 | Yc7 | Yc8 | Yc9 | Yca | Ycb | Ycc | Ycd | Yce | Ycf |
| Yd0 | Yd1 | Yd2 | Yd3 | Yd4 | Yd5 | Yd6 | Yd7 | Yd8 | Yd9 | Yda | Ydb | Ydc | Ydd | Yde | Ydf |
| Ye0 | Ye1 | Ye2 | Ye3 | Ye4 | Ye5 | Ye6 | Ye7 | Ye8 | Ye9 | Yea | Yeb | Yec | Yed | Yee | Yef |
| Yf0 | Yf1 | Yf2 | Yf3 | Yf4 | Yf5 | Yf6 | Yf7 | Yf8 | Yf9 | Yfa | Yfb | Yfc | Yfd | Yfe | Yff |

FIG. 5

| UV00 | UV02 | UV04 | UV06 | UV08 | UV0a | UV0c | UV0e |
|------|------|------|------|------|------|------|------|
| UV20 | UV22 | UV24 | UV26 | UV28 | UV2a | UV2c | UV2e |
| UV40 | UV42 | UV44 | UV46 | UV48 | UV4a | UV4c | UV4e |
| UV60 | UV62 | UV64 | UV66 | UV68 | UV6a | UV6c | UV6e |
| UV80 | UV82 | UV84 | UV86 | UV88 | UV8a | UV8c | UV8e |
| UVa0 | UVa2 | UVa4 | UVa6 | UVa8 | UVaa | UVac | UVae |
| UVc0 | UVc2 | UVc4 | UVc6 | UVc8 | UVca | UVcc | UVce |
| UVe0 | UVe2 | UVe4 | UVe6 | UVe8 | UVea | UVec | UVee |

FIG. 6

| Y00 | Y01 | Y02 | Y03 | Y04 | Y05 | Y06 | Y07 | Y08 | Y09 | Y0a | Y0b | Y0c | Y0d | Y0e | Y0f |
|---|---|---|---|---|---|---|---|---|---|---|---|---|---|---|---|
| Y20 | Y21 | Y22 | Y23 | Y24 | Y25 | Y26 | Y27 | Y28 | Y29 | Y2a | Y2b | Y2c | Y2d | Y2e | Y2f |
| UV00 | | UV02 | | UV04 | | UV06 | | UV08 | | UV0a | | UV0c | | UV0e | |
| Y40 | Y41 | Y42 | Y43 | Y44 | Y45 | Y46 | Y47 | Y48 | Y49 | Y4a | Y4b | Y4c | Y4d | Y4e | Y4f |
| Y60 | Y61 | Y62 | Y63 | Y64 | Y65 | Y66 | Y67 | Y68 | Y69 | Y6a | Y6b | Y6c | Y6d | Y6e | Y6f |
| UV40 | | UV42 | | UV44 | | UV46 | | UV48 | | UV4a | | UV4c | | UV4e | |
| Y80 | Y81 | Y82 | Y83 | Y84 | Y85 | Y86 | Y87 | Y88 | Y89 | Y8a | Y8b | Y8c | Y8d | Y8e | Y8f |
| Ya0 | Ya1 | Ya2 | Ya3 | Ya4 | Ya5 | Ya6 | Ya7 | Ya8 | Ya9 | Yaa | Yab | Yac | Yad | Yae | Yaf |
| UV80 | | UV82 | | UV84 | | UV86 | | UV88 | | UV8a | | UV8c | | UV8e | |
| Yc0 | Yc1 | Yc2 | Yc3 | Yc4 | Yc5 | Yc6 | Yc7 | Yc8 | Yc9 | Yca | Ycb | Ycc | Ycd | Yce | Ycf |
| Ye0 | Ye1 | Ye2 | Ye3 | Yc4 | Ye5 | Yc6 | Ye7 | Yc8 | Ye9 | Yca | Yeb | Yec | Ycd | Yec | Yef |
| UVc0 | | UVc2 | | UVc4 | | UVc6 | | UVc8 | | UVca | | UVcc | | UVce | |

FIG. 7

| Y10 | Y11 | Y12 | Y13 | Y14 | Y15 | Y16 | Y17 | Y18 | Y19 | Y1a | Y1b | Y1c | Y1d | Y1e | Y1f |
|---|---|---|---|---|---|---|---|---|---|---|---|---|---|---|---|
| Y30 | Y31 | Y32 | Y33 | Y34 | Y35 | Y36 | Y37 | Y38 | Y39 | Y3a | Y3b | Y3c | Y3d | Y3e | Y3f |
| UV20 | | UV22 | | UV24 | | UV26 | | UV28 | | UV2a | | UV2c | | UV2e | |
| Y50 | Y51 | Y52 | Y53 | Y54 | Y55 | Y56 | Y57 | Y58 | Y59 | Y5a | Y5b | Y5c | Y5d | Y5e | Y5f |
| Y70 | Y71 | Y72 | Y73 | Y74 | Y75 | Y76 | Y77 | Y78 | Y79 | Y7a | Y7b | Y7c | Y7d | Y7e | Y7f |
| UV60 | | UV62 | | UV64 | | UV66 | | UV68 | | UV6a | | UV6c | | UV6e | |
| Y90 | Y91 | Y92 | Y93 | Y94 | Y95 | Y96 | Y97 | Y98 | Y99 | Y9a | Y9b | Y9c | Y9d | Y9e | Y9f |
| Yb0 | Yb1 | Yb2 | Yb3 | Yb4 | Yb5 | Yb6 | Yb7 | Yb8 | Yb9 | Yba | Ybb | Ybc | Ybd | Ybe | Ybf |
| UVa0 | | UVa2 | | UVa4 | | UVa6 | | UVa8 | | UVaa | | UVac | | UVae | |
| Yd0 | Yd1 | Yd2 | Yd3 | Yd4 | Yd5 | Yd6 | Yd7 | Yd8 | Yd9 | Yda | Ydb | Ydc | Ydd | Yde | Ydf |
| Yf0 | Yf1 | Yf2 | Yf3 | Yf4 | Yf5 | Yf6 | Yf7 | Yf8 | Yf9 | Yfa | Yfb | Yfc | Yfd | Yfe | Yff |
| UVe0 | | UVe2 | | UVe4 | | UVe6 | | UVe8 | | UVea | | UVec | | UVee | |

IMAGE PROCESSOR AND METHOD FOR MEMORY ACCESS CONTROL

TECHNICAL FIELD

The present invention relates to an image processor and a method for memory access control.

BACKGROUND ART

Patent Literature 1, for example, describes an image processor of a background art. The image processor includes a memory with four banks, among which pixel data pieces composing a macroblock are distributed. For example, pixel data pieces in the first to tenth columns of each of the first and third rows of a macroblock are stored in the 0th bank, pixel data pieces in each of the first to tenth columns of the second and fourth rows are stored in the first bank, pixel data pieces in each of the first to tenth columns of the fifth and seventh rows are stored in the second bank, and the pixel data pieces in each of the first to tenth columns of the sixth and eighth rows are stored in the third bank.

CITATION LIST

Patent Literature

Patent Literature 1: WO2006/129518A

SUMMARY OF THE INVENTION

Problems to be Solved by the Invention

According to the image processor described in the above Patent Literature 1, however, the pixel data pieces successive in rows (vertically) are stored in different banks. Thus sequentially reading multiple pixel data pieces from the memory vertically requires switching of banks for every row. In consequence commands to switch the banks are issued frequently, complicating the processes of reading pixel data from the memory.

The present invention has been made in view of such situation, and is directed to obtaining an image processor and a method for memory access control that achieve reading of pixel data by simple processing.

Means to Solve the Problems

An image processor according to a first aspect of the present invention includes a memory that holds an image and includes multiple memory banks each including multiple unit storage areas, an image processing unit that processes an image, and an access controller that controls an access from the image processing unit to the memory. In storing an image in the memory, the access controller splits the image in multiple groups of unit pixel data pieces each including pixel data of multiple columns by multiple rows, and stores groups of unit pixel data pieces aligned in at least two columns in a pixel space in the same unit storage area in the same memory bank.

In the first aspect of the image processor, in storing an image in the memory, the access controller splits the image in multiple groups of unit pixel data pieces each including pixel data of multiple columns by multiple rows, and stores groups of unit pixel data pieces aligned in at least two columns in a pixel space in the same unit storage area in the same memory bank. Thus in reading multiple groups of unit pixel data pieces from the memory in a direction of columns (horizontally) in order, at least two groups of unit pixel data pieces stored in the same unit storage area in the same memory bank can be read successively without switching memory banks or switching unit storage areas. Furthermore, in reading multiple pixel data pieces from the memory in a direction of rows (vertically) in order, multiple rows of pixel data included in each group of unit pixel data pieces can be read successively without switching memory banks or switching unit storage areas.

An image processor according to a second aspect of the present invention is the image processor according to the first aspect. The access controller stores at least four groups of unit pixel data pieces aligned in at least two columns by at least two rows in a pixel space in the same unit storage area in the same memory bank.

In the second aspect of the image processor, the access controller stores at least four groups of unit pixel data pieces aligned in at least two columns by at least two rows in a pixel space in the same unit storage area in the same memory bank. Thus in reading multiple group of unit pixel data pieces from the memory in a direction of row (vertically) in order, at least two groups of unit pixel data pieces stored in the same unit storage area in the same memory bank can be read successively without switching memory banks or switching unit storage areas.

A third aspect of an image processor according to the present invention is the first or second aspect of the image processor. In reading a desired image area from the memory, the access controller reads multiple groups of unit pixel data pieces included in the image area without successive access to different unit storage areas in the same memory bank.

In the third aspect of the image processor, in reading a desired image area from the memory, the access controller reads multiple groups of unit pixel data pieces included in the image area without successive access to different unit storage areas in the same memory bank. Avoiding successive access to different unit storage areas in the same memory bank prevents latency due to precharge, achieving reduction in time required for a read.

An image processor according to a fourth aspect of the present invention is the image processor according to the third aspect. In reading a desired image area from the memory, the access controller reads multiple groups of unit pixel data pieces included in the image area by successive access to the same unit storage area in the same memory bank.

In the fourth aspect of the image processor, in reading a desired image area from the memory, the access controller reads multiple groups of unit pixel data pieces included in the image area by successive access to the same unit storage area in the same memory bank. Successive access to the same unit storage area in the same memory bank requires no repeated precharge, achieving prevention of latency due to precharge.

A fifth aspect of an image processor according to the present invention is the image processor according to third or fourth aspect. In reading a desired image area from the memory, the access controller reads multiple groups of unit pixel data pieces included in the image area by successive access to different memory banks.

In the fifth aspect of the image processor, in reading a desired image area from the memory, the access controller reads multiple groups of unit pixel data pieces included in the image area by successive access to different memory banks. During access to a certain memory bank, precharge of a subsequent memory banks can be performed, which prevents latency due to precharge.

A sixth aspect of an image processor according to the present invention is the image processor according to any one of first to fifth aspect. In storing a macroblock in the memory, the access controller splits the macroblock in a first group of unit pixel data pieces collectively including pixel data of even-numbered rows in the macroblock and a second group of unit pixel data pieces collectively including pixel data of odd-numbered rows in the macroblock.

In the sixth aspect of the image processor, the access controller splits a macroblock in a first group of unit pixel data pieces collectively including pixel data of even-numbered rows in the macroblock and a second group of unit pixel data pieces collectively including pixel data of odd-numbered rows in the macroblock. Thus reading both first and second groups of unit pixel data pieces realizes reading a frame image from the memory to the image processing unit, and reading either one of first and second groups of unit pixel data pieces realizes reading a field image from the memory to the image processing unit.

An image processor according to a seventh aspect of the present invention is the image processor according to any one of first to sixth aspect. In storing a macroblock pair including a first and second macroblocks in the memory, the access controller splits the macroblock pair in a first group of unit pixel data pieces collectively including pixel data of even-numbered rows in the first macroblock, a second group of unit pixel data pieces collectively including pixel data of odd-numbered rows in the first macroblock, a third group of unit pixel data pieces collectively including pixel data of even-numbered rows in the second macroblock, and a fourth group of unit pixel data pieces collectively including pixel data of odd-numbered rows in the second macroblock.

In the seventh aspect of the image processor, the access controller splits a macroblock pair in a first group of unit pixel data pieces collectively including pixel data of even-numbered rows in a first macroblock, a second group of unit pixel data pieces collectively including pixel data of odd-numbered rows in the first macroblock, a third group of unit pixel data pieces collectively including pixel data of even-numbered rows in a second macroblock, and a fourth group of unit pixel data pieces collectively including pixel data of odd-numbered rows in the second macroblock. Thus reading all of the first to fourth groups of unit pixel data pieces realizes reading a frame image of a macroblock pair from the memory to the image processing unit, and reading either first and third groups of unit pixel data pieces or second and fourth groups of unit pixel data pieces realizes reading a field image of a macroblock pair from the memory to the image processing unit.

An eighth aspect of an image processor according to the present invention is the image processor according to any one of first to seventh aspects. The group of unit pixel data pieces include both luminance and chrominance data.

In the eighth aspect of the image processor, a group of unit pixel data pieces includes both luminance and chrominance data. Thus in comparison with luminance and chrominance data stored in different memory banks, reading corresponding luminance and chrominance data is facilitated.

A ninth aspect of an image processor according to the present invention is the image processor according to any one of first to eighth aspects. In writing an image to the memory, the access controller allows writing the image with a transfer size equal to a size of the group of unit pixel data pieces.

In the ninth aspect of the image processor, the access controller allows writing an image to the memory with a transfer size equal to the size of the group of unit pixel data pieces. With a transfer size equal to the size of a group of unit pixel data pieces, the group of unit pixel data pieces is written from the image processing unit to the memory by one data transfer.

A tenth aspect of an image processor according to the present invention is the image processor according to any one of the first to ninth aspect. In writing an image to the memory, the access controller allows writing the image with a transfer size smaller than a size of the group of unit pixel data pieces.

In the tenth aspect of the image processor, the access controller allows writing an image to the memory with a transfer size smaller than the size of a group of unit pixel data pieces. With a transfer size smaller than the size of a group of unit pixel data pieces, the group of unit pixel data pieces is written from the image processing unit to the memory by multiple data transfers.

An image processor according to an eleventh aspect of the present invention is the image processor according to any one of the first to tenth aspect. In reading an image from the memory, the access controller reads the image with a transfer size equal to a size of the group of unit pixel data pieces.

In the eleventh aspect of the image processor, the access controller allows reading an image from the memory with a transfer size equal to the size of a group of unit pixel data pieces. With a transfer size equal to the size of the group of unit pixel data pieces, the group of unit pixel data pieces is read from the memory to the image processing unit by one data transfer.

An image processor according to a twelfth aspect is the image processor according to any one of the first to eleventh aspect. In reading an image from the memory, the access controller allows reading the image with a transfer size smaller than a size of the group of unit pixel data pieces.

In the twelfth aspect of the image processor, the access controller allows reading an image from the memory with a transfer size smaller than the size of the group of unit pixel data pieces. With a transfer size smaller than the size of the group of unit pixel data pieces, unnecessary data transfer from the memory to the image processing unit is prevented.

An image processor according to a thirteenth aspect of the present invention is the image processor according to any one of the first to twelfth aspect. The access controller includes an address setting unit that sets a memory bank for storing each group of unit pixel data pieces among multiple memory banks of the memory, based on a positional coordinate of the group of unit pixel data pieces in a pixel space.

In the thirteenth aspect of the image processor, the address setting unit sets a memory bank for storing each group of unit pixel data pieces among multiple memory banks of the memory, based on a positional coordinate of the group of unit pixel data pieces in a pixel space. Thus each group of unit pixel data pieces is stored in an appropriate memory bank.

An image processor according a fourteenth aspect of the present invention is the image processor according to the thirteenth aspect. The address setting unit sets an address of an image having a horizontal size that is not a power of 2, with an arithmetic model corresponding to an image having a horizontal size that is a power of 2.

In the fourteenth aspect of the image processor, the address setting unit sets an address of an image having a horizontal size that is not a power of 2, with an arithmetic model corresponding to an image having a horizontal size that is a power of 2. Thus in arithmetically setting a physical address for storing each group of unit pixel data pieces in the memory, no multiplier is required, achieving reduction in circuit size of an arithmetic circuit.

A method for memory access control according to a fifteenth aspect of the present invention includes controlling an access from an image processing unit that processes an image to a memory that holds the image and including multiple memory banks each having multiple unit storage areas, and in storing the image in the memory, splitting the image into multiple groups of unit pixel data pieces including pixel data of multiple columns by multiple rows, and storing groups of unit pixel data pieces aligned in at least two columns in a pixel space in an identical unit storage area in an identical memory bank.

According to a method for memory access control of the fifteenth aspect, in storing an image in the memory, the image is split in multiple group of unit pixel data pieces each including pixel data aligned in multiple columns by multiple rows, and groups of unit pixel data pieces aligned in at least two columns in a pixel space are stored in an identical unit storage area in an identical memory banks. Thus in reading multiple groups of unit pixel data pieces from the memory in a direction of columns (horizontally) in order, at least two groups of unit pixel data pieces stored in the same unit storage area in the same memory bank can be read successively without switching memory banks or switching unit storage areas. Furthermore, in reading multiple pixel data pieces from the memory in a direction of rows (vertically) in order, multiple rows of pixel data included in each group of unit pixel data pieces can be read successively without switching memory banks or switching unit storage areas.

Effects of the Invention

According to the present invention, an image processor and a method for memory access control that achieve reading of pixel data by simple processing is obtained.

These and other objects, features, aspects and advantages of the present invention will become more apparent from the following detailed description of the present invention when taken in conjunction with the accompanying drawings.

BRIEF DESCRIPTION OF DRAWINGS

FIG. 3 is a diagram illustrating how the access controller stores a macroblock in the memory.

FIG. 4 is a diagram for illustrating generation of a packed word by the access controller.

FIG. 5 is a diagram for illustrating generation of a packed word by the access controller.

FIG. 6 is a diagram for illustrating generation of a packed word by the access controller.

FIG. 7 is a diagram for illustrating generation of a packed word by the access controller.

FIG. 11 is a diagram illustrating a first example of distribution of packed words.

FIG. 12 is a diagram illustrating a first example of distribution of packed words.

FIG. 15 is a diagram illustrating a third example of distribution of packed words.

FIG. 16 is a diagram illustrating a third example of distribution of packed words.

FIG. 17 is a diagram illustrating a fourth example of distribution of packed words.

FIG. 18 is a diagram illustrating a fourth example of distribution of packed words.

FIG. 19 is a diagram illustrating a fifth example of distribution of packed words.

FIG. 20 is a diagram illustrating a fifth example of distribution of packed words.

FIG. 21 is a diagram illustrating a sixth example of distribution of packed words.

FIG. 22 is a diagram illustrating a sixth example of distribution of packed words.

DESCRIPTION OF THE INVENTION

Figure 1:
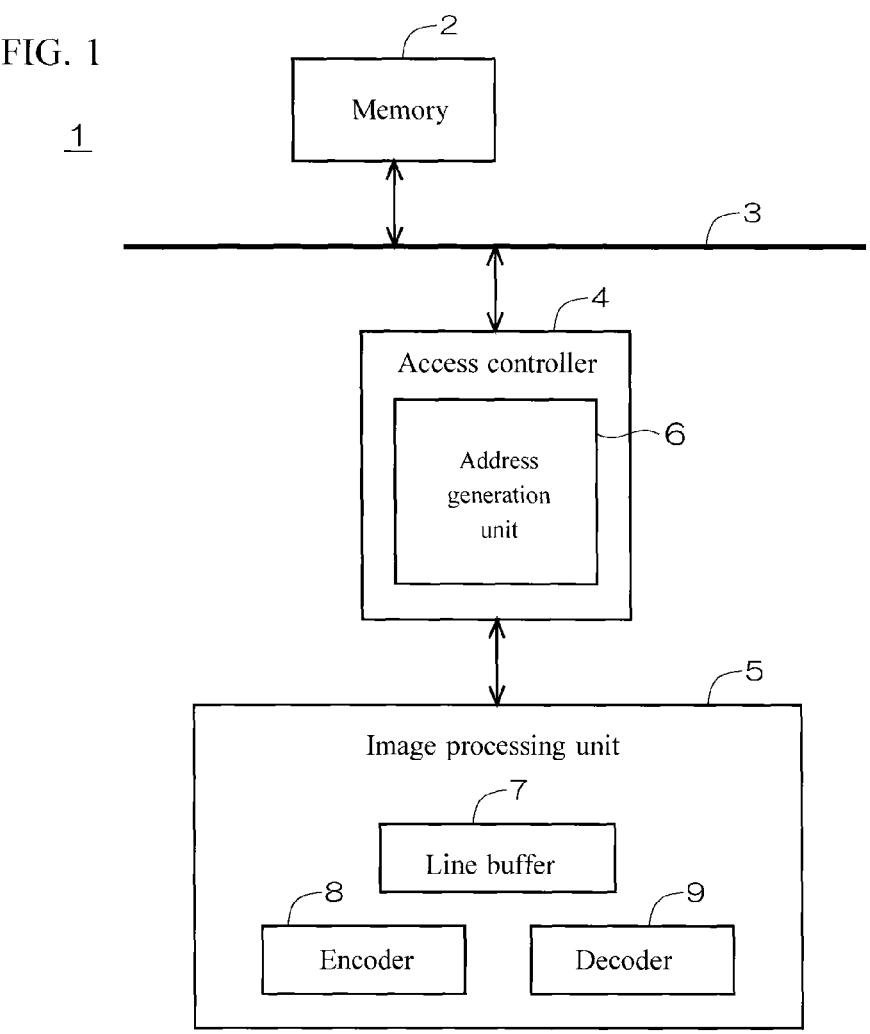
FIG. 1 is a simplified diagram illustrating an overall configuration of an image processor according to an embodiment of the present invention.

Preferred embodiments of the present invention are described in detail below referring to the drawings. It should be noted that identical reference numerals throughout the drawings indicate identical or equivalent elements.

FIG. 1 is a simplified diagram illustrating an overall configuration of an image processor 1 according to an embodiment of the present invention. As illustrated in FIG. 1, the image processor 1 includes a memory 2, a system bus 3, an access controller 4, and an image processing unit 5. The image processing unit 5 is in conformity to standards such H.264, and includes a line buffer 7, an encoder 8, and decoder 9. The access controller 4 controls an access (read and write accesses) from the image processing unit 5 to the memory 2 by a Direct Memory Access (DMA). The access controller 4 includes an address generation unit 6. The memory 2 is configured with, for example, a Dynamic Random Access Memory (DRAM), and holds images such as an original image, a reference image to be referred to by the encoder 8 and the decoder 9, a local decoded image produce by the encoder 8, and a decoded image produce by the decoder 9.

Figure 2:
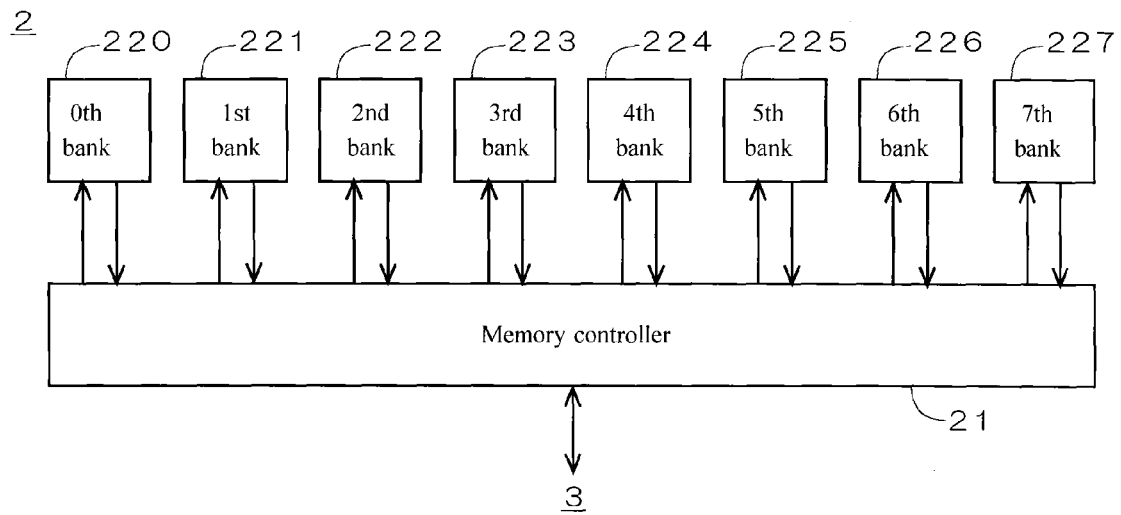
FIG. 2 is a diagram illustrating a configuration of the memory.

FIG. 2 is a diagram illustrating a configuration of the memory 2. The memory 2 is split in multiple memory banks, being configured with eight memory banks in total including 0th bank 220 to seventh bank 227 in this example. The memory banks are connected to a memory controller 21. Each of the memory banks has multiple Rows (unit storage areas). A Row forms a unit to control precharge in the DRAM. Multiple pixel data pieces in the same Row are read successively (i.e., without latency for precharge), and multiple pixel data pieces are written to the same Row successively.

FIG. 3 is a diagram illustrating how the access controller 4 stores a macroblock in the memory 2. The access controller 4 splits one macroblock of 16 columns×16 rows in two groups of unit pixel data pieces (hereinafter, "packed word"), and stores an image in the memory 2 in units of packed word.

FIGS. 4 to 7 are diagrams for illustrating generation of a packed word by the access controller 4. FIGS. 4 and 5 respectively illustrate luminance and chrominance data (in YUV420 format in the example of the present embodiment) included in one macroblock. The access controller 4 extracts and arranges luminance and chrominance data in even-numbered rows, so as to generate a top-field packed word illustrated in FIG. 6. The access controller 4 also extracts and arranges luminance and chrominance data in odd-numbered rows, so as to a bottom-field packed word illustrated in FIG. 7. As illustrated in FIGS. 6 and 7, each packed word includes four pairs of luminance data of two rows and the corresponding chrominance data (corresponding to 8 rows of luminance). In other words, each of the packed words include pixel data (luminance and chrominance data) corresponding to 16 columns×8 rows of luminance. The memory 2 holds a total of two packed words including a top-field packed word and a bottom-field packed word for one macroblock.

In reading an image, the access controller 4 reads both top-field and bottom-field packed words, so as to read a frame macroblock from the memory 2 to the image processing unit 5. Furthermore, by reading a top-field or bottom-field packed word, a field macroblock can be read from the memory 2 to the image processing unit 5.

Figure 8:
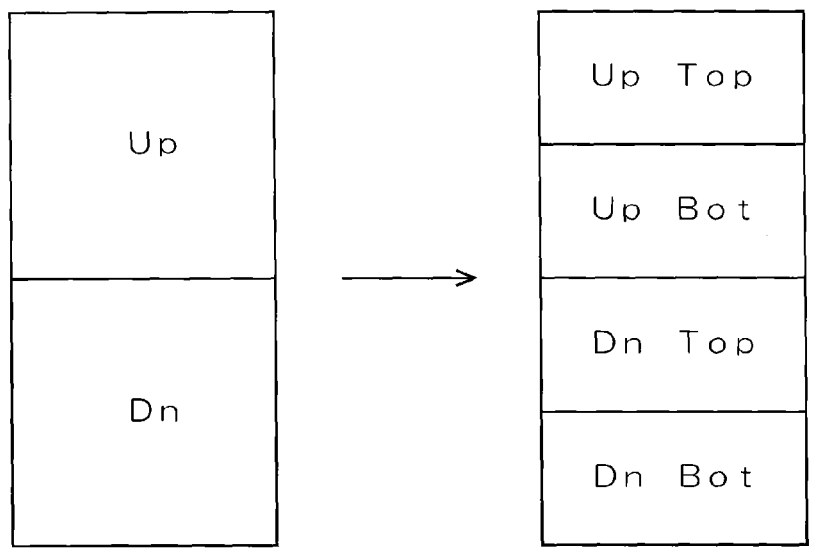
FIG. 8 is a diagram illustrating how the access controller stores a macroblock pair in the memory.

FIG. 8 is a diagram illustrating how the access controller 4 stores a macroblock pair in the memory 2. The access controller 4 splits an up macroblock in two packed words of top and bottom fields, and also splits a down macroblock in two packed words of top and bottom fields. The memory 2 holds four packed words in total corresponding to one macroblock pair, including the top-field packed word of the up macroblock, the bottom-field packed word of the up macroblock, the top-field packed word of the down macroblock, and the bottom-field packed word of the down macroblock.

Figure 9:
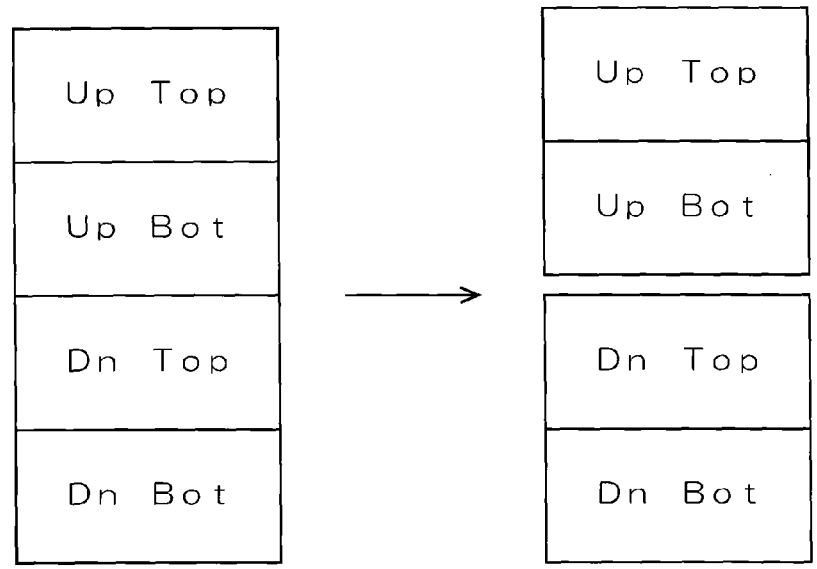
FIG. 9 is a diagram illustrating how the access controller reads a macroblock pair from the memory.
Figure 10:
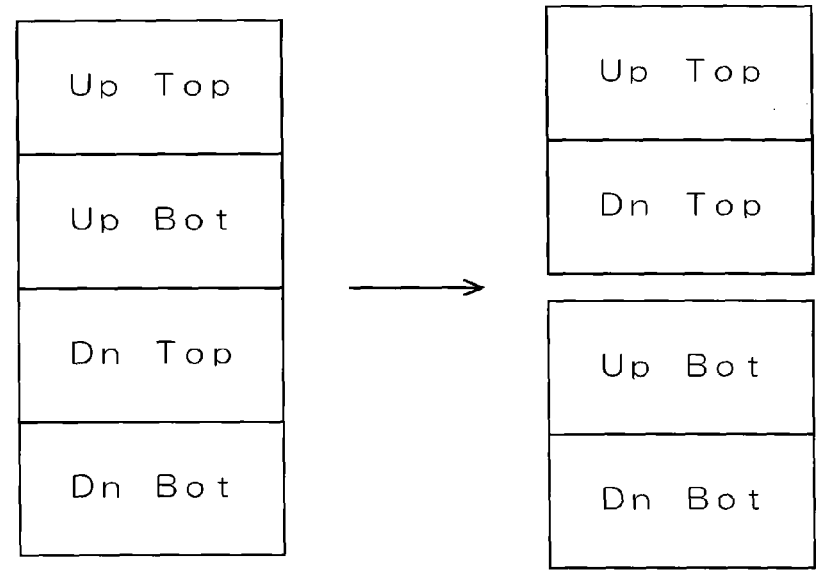
FIG. 10 is a diagram illustrating how the access controller reads a macroblock pair from the memory.

FIGS. 9 and 10 are diagrams illustrating how the access controller 4 reads a macroblock pair from the memory 2. As illustrated in FIG. 9, the access controller 4 reads packed words of each of the top and bottom fields of the up macroblock in pairs, and reads packed words of each of the top and bottom fields of the down macroblock in pairs, so as to read pairs of frame macroblocks from the memory 2 to the image processing unit 5. As illustrated in FIG. 10, packed words of the top fields of each of the up macroblock and the down macroblock are read in pairs, and packed words of the bottom fields of each of the up macroblock and the down macroblock are read in pairs, so as to read pairs of field macroblocks from the memory 2 to the image processing unit 5.

Distribution of packed words among multiple memory banks in storing an image in the memory 2 are described below. The present embodiment is based on the assumption that a full HD image of 1920 columns×1080 rows is to be stored in the memory 2. In the present embodiment, image data has a bit length of 8 bits, and one packed word has a data size of 192 bytes (=16×8×1.5).

Figures 11, 12:
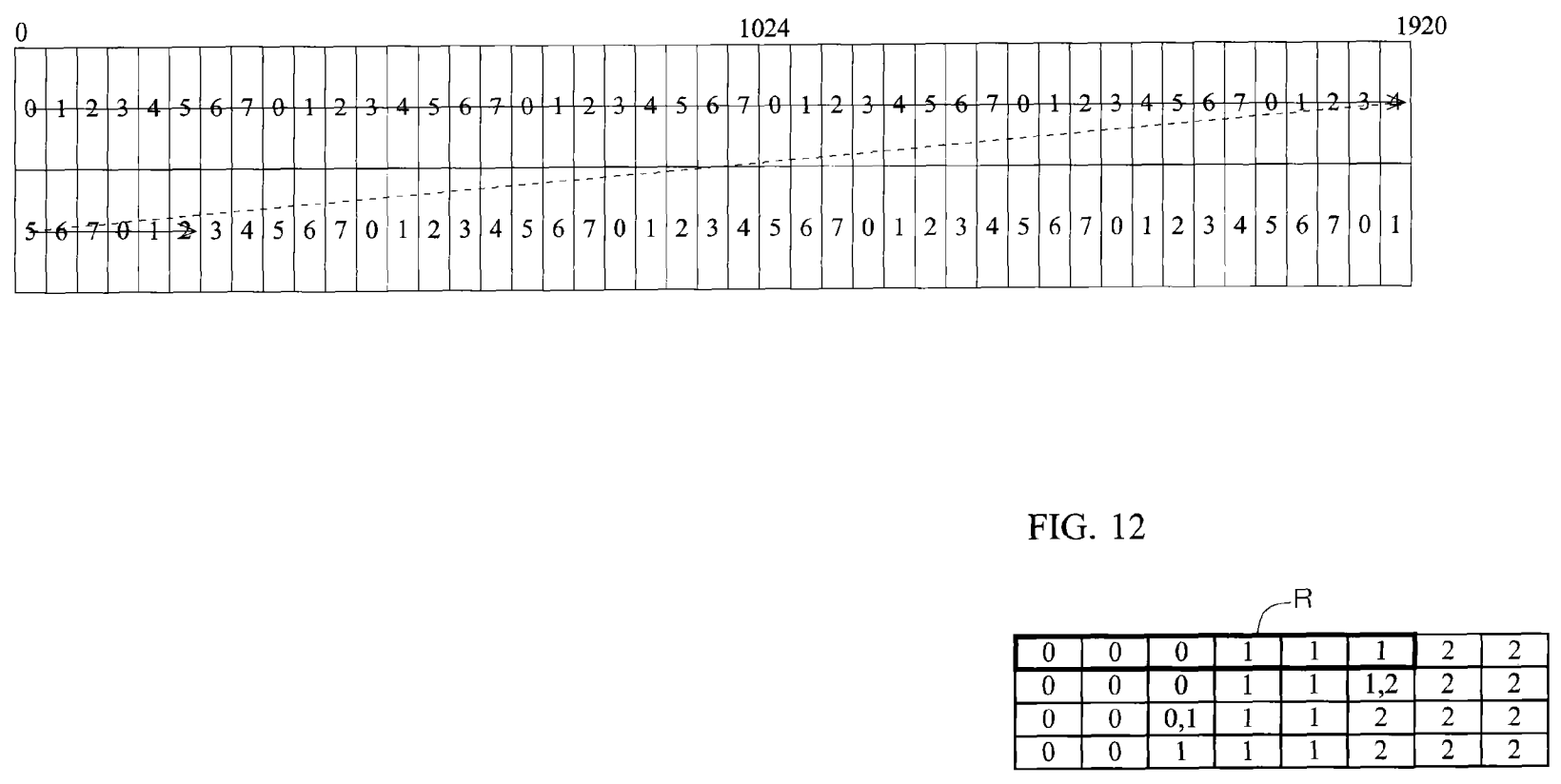

FIGS. 11 and 12 are diagrams illustrating a first example of distribution of packed words. FIG. 11 illustrates a representative pixel space of 1920 columns×64 rows out of an image to be stored in the memory 2. Each box in the figure indicates an image area corresponding to one Row, with the numbers "0" to "7" in the box indicating bank addresses to identify the 0th bank 220 to the 7th bank 227. FIG. 12 illustrates an image area corresponding to three Rows at the top-left corner of the pixel space illustrated in FIG. 11. Each box in the figure indicates one packed word, with the numbers in the box indicating bank address.

The example in FIGS. 11 and 12 is based on the assumption that one Row has a data size of 2048 bytes. Thus as illustrated in FIG. 12, one Row holds approximately 10.6 packed words, three Rows holding 32 packed words (8 columns×4 rows). For example, the packed word at the top-left corner in FIG. 12 is a top-field packed word of an up macroblock, the packed word beneath is a bottom-field packed word of the up macroblock, the packed word further beneath is a top-field packed word of a down macroblock, and the packed word still further beneath is a bottom-field packed word of the down macroblock.

As illustrated in FIG. 12, at least four packed words aligned in at least two columns by at least two rows in a pixel space are stored in the same Row of the same memory bank. Thus in reading six packed words enclosed by the thick line R, for example, three packed words on the left are read by successive access to the same Row in the 0th bank 220, and then three packed words on the right are read by successive access to the same Row in the 1st bank 221 different from the 0th bank 220. Thus successive access to different Rows in the same memory bank does not occur in reading a desired image area from the memory 2.

Referring to FIG. 11, bank addresses "0" to "7" are allotted to each image area in order as indicated by the arrow in the figure, and the pixel data in each image area is stored in the Rows of the memory bank corresponding to the allotted bank address. The bank addresses and the Rows are configured by the address generation unit 6 illustrated in FIG. 1, based on a positional coordinate of each packed word in a pixel space. As illustrated in FIG. 11, different bank addresses are allotted between two horizontally-adjacent image areas, and between two vertically-adjacent image areas.

Figures 13, 14:
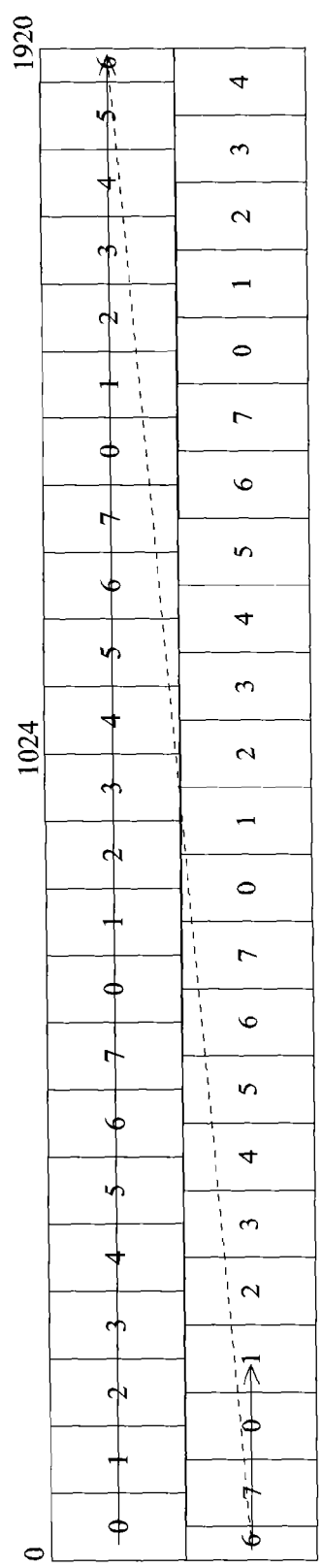
FIG. 13 is a diagram illustrating a second example of distribution of packed words.
FIG. 14 is a diagram illustrating a second example of distribution of packed words.

FIGS. 13 and 14 are diagrams illustrating a second example of distribution of packed words. FIG. 13 illustrates a representative pixel space of 1920 columns×64 rows out of an image to be stored in the memory 2. FIG. 14 illustrates an image area corresponding to three Rows at the top-left corner of the pixel space illustrated in FIG. 13.

The example in FIGS. 13 and 14 is based on the assumption that one Row has a data size of 4096 bytes. Thus as illustrated in FIG. 14, one Row holds approximately 21.3 packed words, three Rows holding 64 packed words (16 columns×4 rows). Similar to the above, at least four packed words aligned in at least two columns by at least two rows in a pixel space are stored in the same Row of the same memory bank. Thus successive access to different Rows in the same memory bank does not occur in reading a desired image area from the memory 2.

Referring to FIG. 13 bank addresses "0" to "7" are allotted to each image area in order as indicated by the arrow in the figure, and the pixel data in each image area is stored in the Rows of the memory bank corresponding to the allotted bank address. Similar to the above, different bank addresses are allotted between two horizontally-adjacent image areas, and between two vertically-adjacent image areas.

Figures 15, 16:
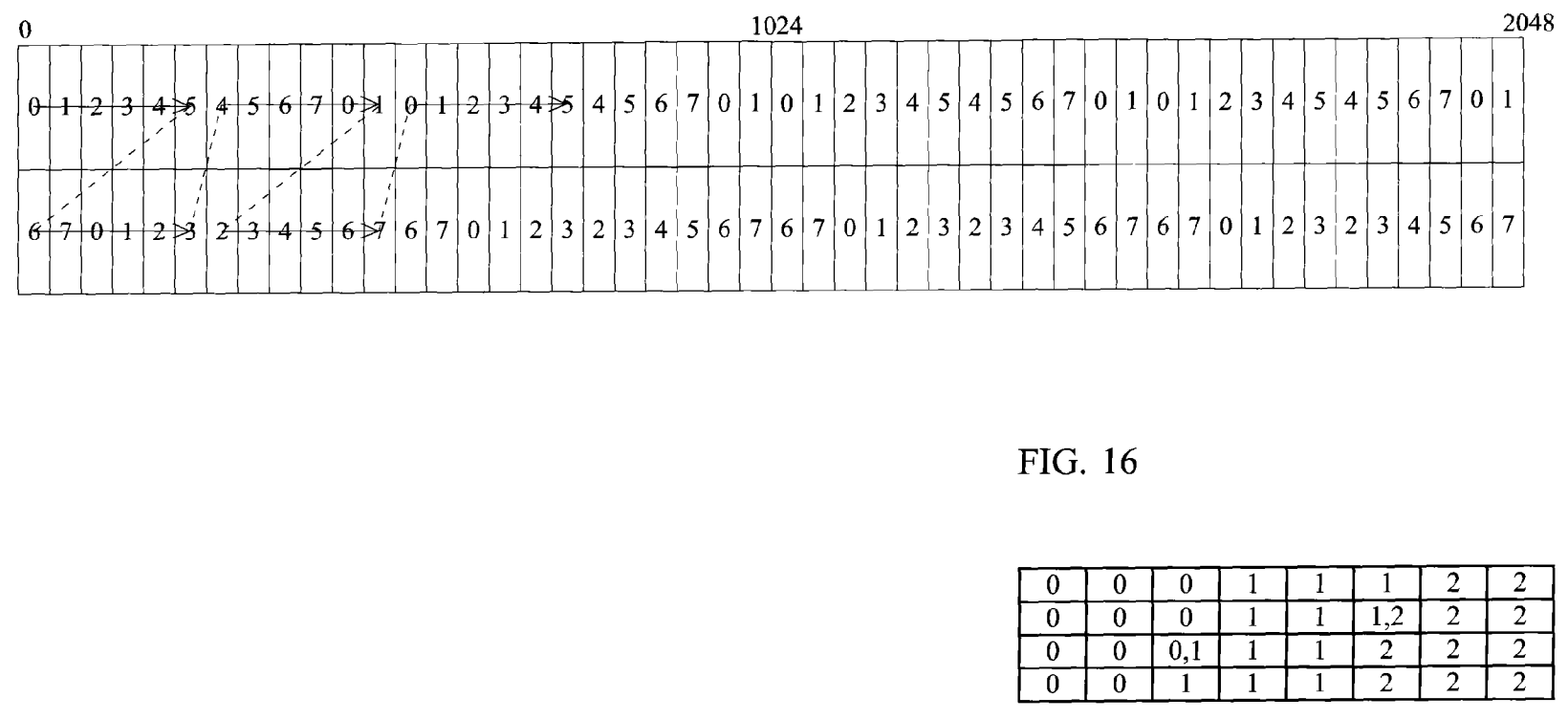

FIGS. 15 and 16 are diagrams illustrating a third example of distribution of packed words. FIG. 15 illustrates a representative pixel space of 1920 columns×64 rows out of an image to be stored in the memory 2. FIG. 16 illustrates an image area corresponding to three Rows at the top-left corner of the pixel space illustrated in FIG. 15.

In the examples of FIGS. 11 and 13, the address generation unit 6 sets bank addresses with an arithmetic model of 1920 horizontal pixels that is equal to horizontal pixel number of an image, while in the example of FIG. 15, the address generation unit 6 sets bank addresses with an arithmetic model of 2048 horizontal pixels that is a power of 2, instead of a full HD image with 1920 horizontal pixels that is not a power of 2.

The example in FIG. 15 is based on the assumption that one Row has a data size of 2048 bytes. Thus as illustrated in FIG. 16, one Row holds approximately 10.6 packed words, three Rows holding 32 packed words (8 columns×4 rows). Similar to the above, at least four packed words aligned in at least two columns by at least two rows in a pixel space are stored in the same Row of the same memory bank. Thus successive access to different Rows in the same memory bank does not occur in reading a desired image area from the memory 2.

Referring to FIG. 15, bank addresses "0" to "7" are allotted to each image area in order as indicated by the arrow in the figure, and the pixel data in each image area is stored in the Rows of the memory bank corresponding to the allotted bank address. Similar to the above, different bank addresses are allotted between two horizontally-adjacent image areas, and between two vertically-adjacent image areas.

Figures 17, 18:
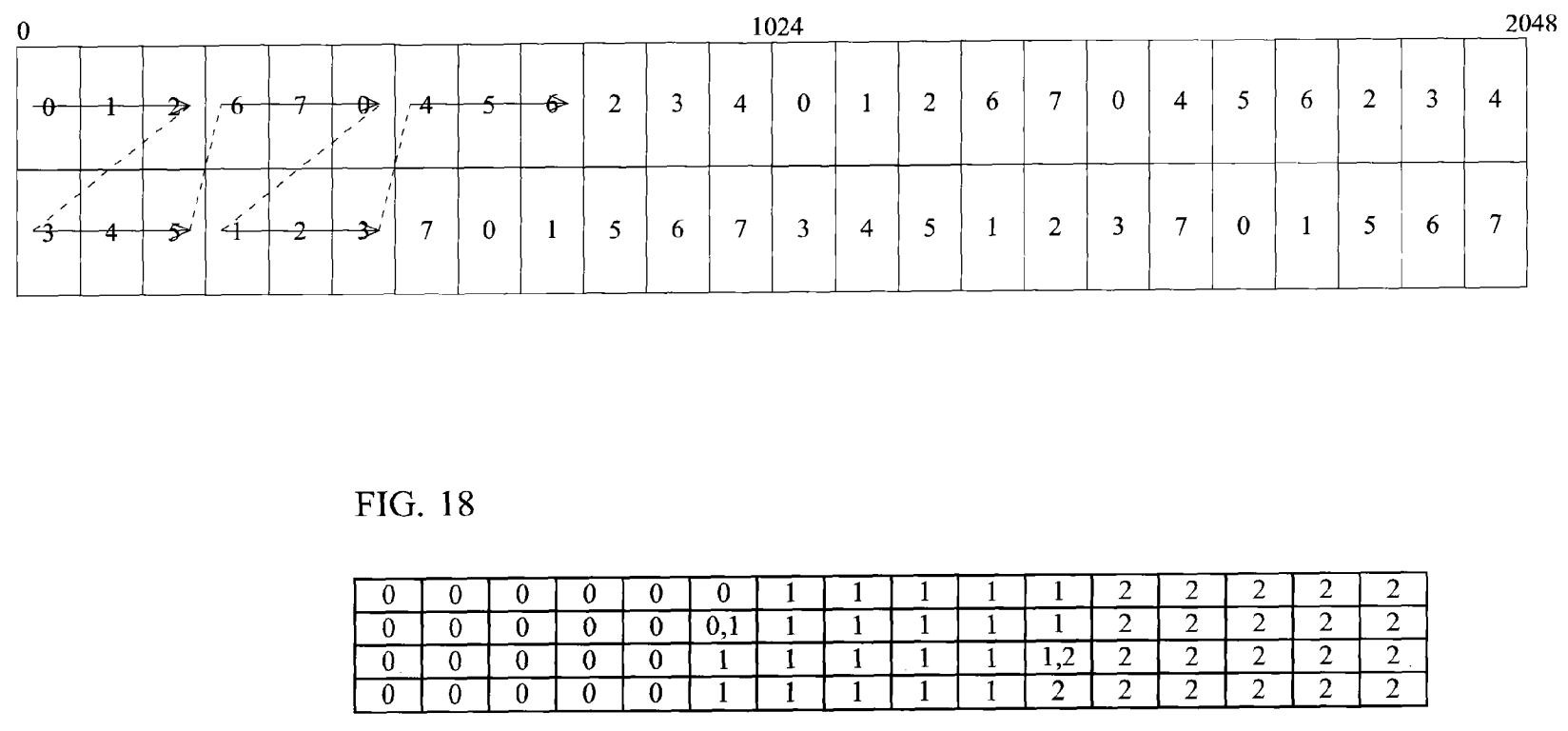

FIGS. 17 and 18 are diagrams illustrating a fourth example of distribution of packed words. FIG. 17 illustrates a representative pixel space of 1920 columns×64 rows out of an image to be stored in the memory 2. FIG. 18 illustrates an image area corresponding to three Rows at the top-left corner of the pixel space illustrated in FIG. 17. In the example of FIG. 17, the address generation unit 6 sets bank addresses with an arithmetic model of 2048 horizontal pixels.

The example in FIG. 17 is based on the assumption that one Row has a data size of 4096 bytes. Thus as illustrated in FIG. 18, one Row holds approximately 21.3 packed words, three Rows holding 64 packed words (16 columns×4 rows). Similar to the above, at least four packed words aligned in at least two columns by at least two rows in a pixel space are stored in the same Row of the same memory bank. Thus successive access to different Rows in the same memory bank does not occur in reading a desired image area from the memory 2.

Referring to FIG. 17, bank addresses "0" to "7" are allotted to each image area in order as indicated by the arrow in the figure, and the pixel data in each image area is stored in the Rows of the memory bank corresponding to the allotted bank address. Similar to the above, different bank addresses are allotted between two horizontally-adjacent image areas, and between two vertically-adjacent image areas.

Figures 19, 20:
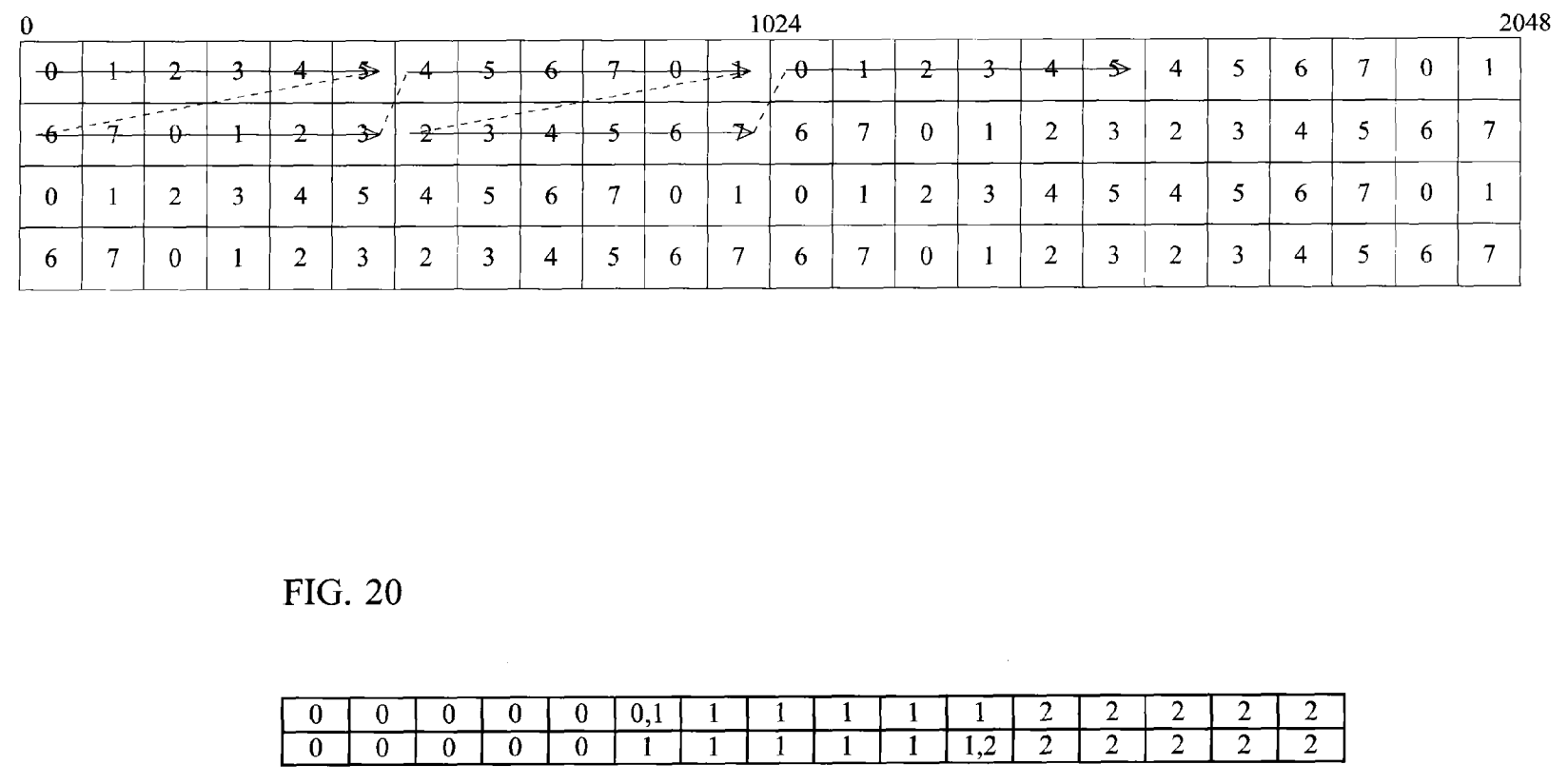

FIGS. 19 and 20 are diagrams illustrating a fifth example of distribution of packed words. FIG. 19 illustrates a representative pixel space of 1920 columns×64 rows out of an image to be stored in the memory 2. FIG. 20 illustrates an image area corresponding to three Rows at the top-left corner of the pixel space illustrated in FIG. 19. In the example of FIG. 19, the address generation unit 6 sets bank addresses with an arithmetic model of 2048 horizontal pixels.

The example in FIG. 19 is based on the assumption that one Row has a data size of 2048 bytes. Thus as illustrated in FIG. 20, one Row holds approximately 10.6 packed words, three Rows holding 32 packed words (16 columns×2 rows). Similar to the above, at least four packed words aligned in at least two columns by at least two rows in a pixel space are stored in the same Row of the same memory bank. Thus successive access to different Rows in the same memory bank does not occur in reading a desired image area from the memory 2.

Referring to FIG. 19, bank addresses "0" to "7" are allotted to each image area in order as indicated by the arrow in the figure, and the pixel data in each image area is stored in the Rows of the memory bank corresponding to the allotted bank address. Similar to the above, different bank addresses are allotted between two horizontally-adjacent image areas, and between two vertically-adjacent image areas.

Figures 21, 22:
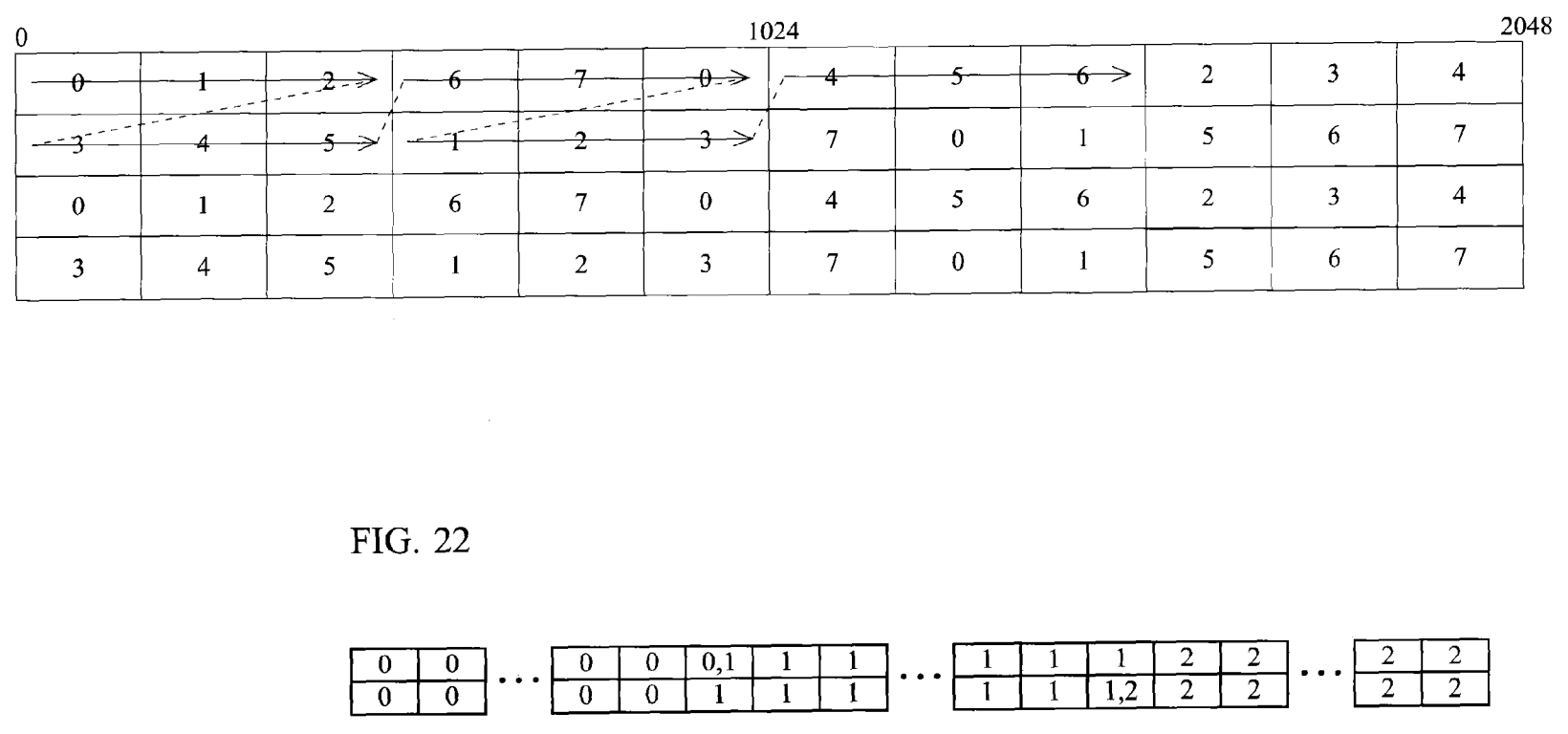

FIGS. 21 and 22 are diagrams illustrating a sixth example of distribution of packed words. FIG. 21 illustrates a representative pixel space of 1920 columns×64 rows out of an image to be stored in the memory 2. FIG. 22 illustrates an image area corresponding to three Rows at the top-left corner of the pixel space illustrated in FIG. 21. In the example of FIG. 21, the address generation unit 6 sets bank addresses with an arithmetic model of 2048 horizontal pixels.

The example in FIG. 21 is based on the assumption that one Row has a data size of 4096 bytes. Thus as illustrated in FIG. 22, one Row holds approximately 21.3 packed words, three Rows holding 64 packed words (32 columns×2 rows).

Similar to the above, at least four packed words aligned in at least two columns by at least two rows in a pixel space are stored in the same Row of the same memory bank. Thus successive access to different Rows in the same memory bank does not occur in reading a desired image area from the memory 2.

Referring to FIG. 21, bank addresses "0" to "7" are allotted to each image area in order as indicated by the arrow in the figure, and the pixel data in each image area is stored in the Rows of the memory bank corresponding to the allotted bank address. Similar to the above, different bank addresses are allotted between two horizontally-adjacent image areas, and between two vertically-adjacent image areas.

Figure 23:
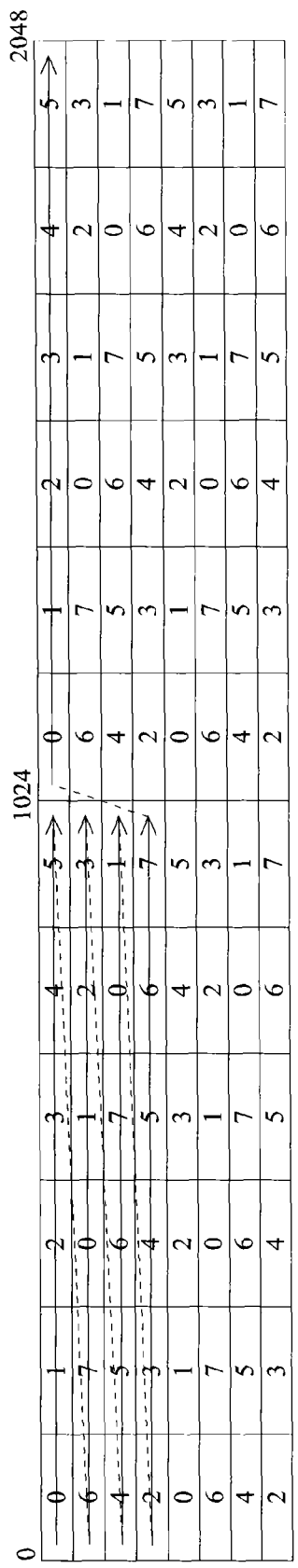
FIG. 23 is a diagram illustrating a seventh example of distribution of packed words.
Figure 24:
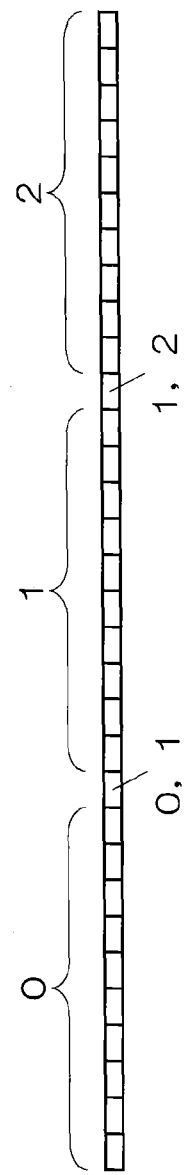
FIG. 24 is a diagram illustrating a seventh example of distribution of packed words.

FIGS. 23 and 24 are diagrams illustrating a seventh example of distribution of packed words. FIG. 23 illustrates a representative pixel space of 1920 columns×64 rows out of an image to be stored in the memory 2. FIG. 24 illustrates an image area corresponding to three Rows at the top-left corner of the pixel space illustrated in FIG. 23. In the example of FIG. 23, the address generation unit 6 sets bank addresses with an arithmetic model of 2048 horizontal pixels.

The example in FIG. 23 is based on the assumption that one Row has a data size of 2048 bytes. Thus as illustrated in FIG. 24, one Row holds approximately 10.6 packed words, three Rows holding 32 packed words (32 columns×1 row). Similar to the above, packed words aligned in at least two columns in a pixel space are stored in the same Row of the same memory bank. Thus successive access to different Rows in the same memory bank does not occur in reading a desired image area from the memory 2.

Referring to FIG. 23, bank addresses "0" to "7" are allotted to each image area in order as indicated by the arrow in the figure, and the pixel data in each image area is stored in the Rows of the memory bank corresponding to the allotted bank address. Similar to the above, different bank addresses are allotted between two horizontally-adjacent image areas, and between two vertically-adjacent image areas.

Figure 25:
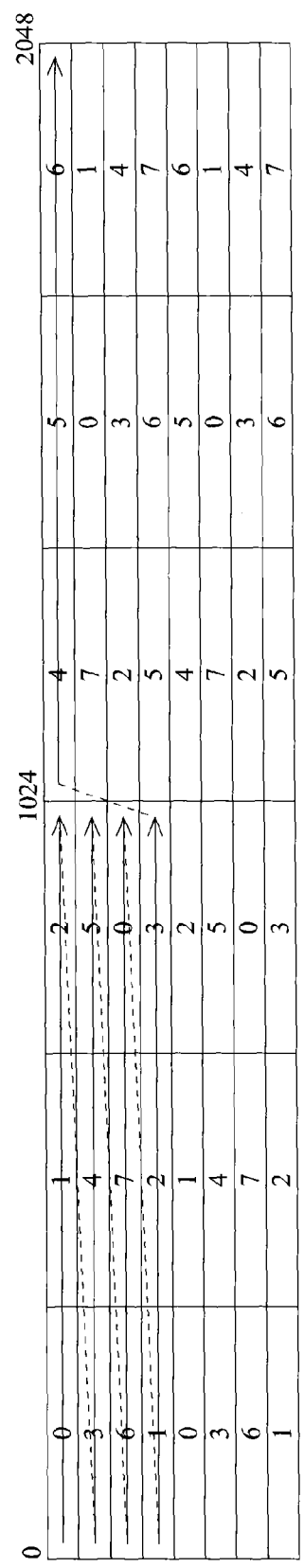
FIG. 25 is a diagram illustrating an eighth example of distribution of packed words.
Figure 26:
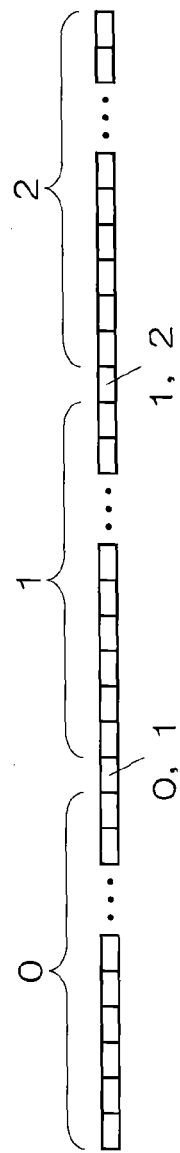
FIG. 26 is a diagram illustrating an eighth example of distribution of packed words.

FIGS. 25 and 26 are diagrams illustrating an eighth example of distribution of packed words. FIG. 25 illustrates a representative pixel space of 1920 columns×64 rows out of an image to be stored in the memory 2. FIG. 26 illustrates an image area corresponding to three Rows at the top-left corner of the pixel space illustrated in FIG. 25. In the example of FIG. 25, the address generation unit 6 sets bank addresses with an arithmetic model of 2048 horizontal pixels.

The example in FIG. 25 is based on the assumption that one Row has a data size of 4096 bytes. Thus as illustrated in FIG. 26, one Row holds approximately 21.3 packed words, three Rows holding 64 packed words (64 columns×1 row). Similar to the above, packed words aligned in at least two columns in a pixel space are stored in the same Row of the same memory bank. Thus successive access to different Rows in the same memory bank does not occur in reading a desired image area from the memory 2.

Referring to FIG. 25, bank addresses "0" to "7" are allotted to each image area in order as indicated by the arrow in the figure, and the pixel data in each image area is stored in the Rows of the memory bank corresponding to the allotted bank address. Similar to the above, different bank addresses are allotted between two horizontally-adjacent image areas, and between two vertically-adjacent image areas.

Figure 27:
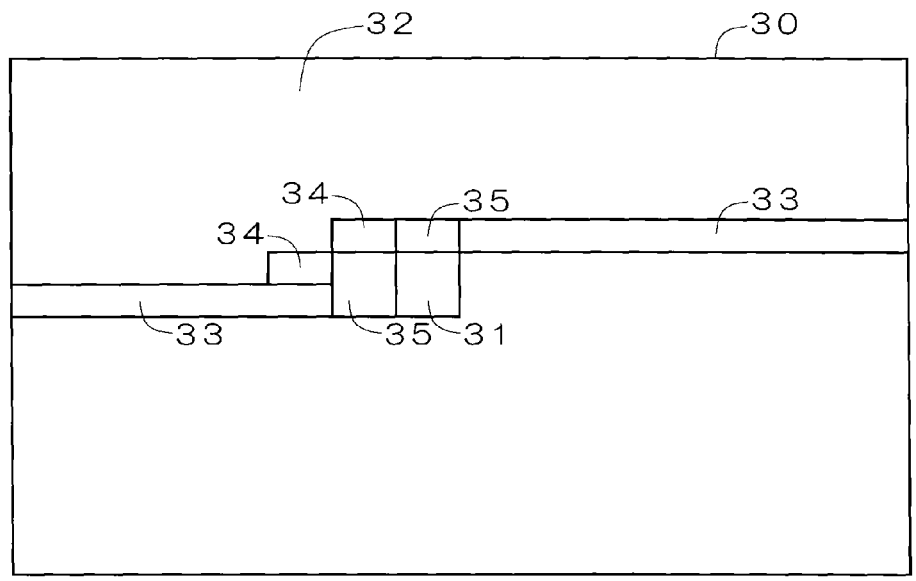
FIG. 27 is a diagram illustrating a first example of writing an image from the image processing unit to the memory.

FIG. 27 is a diagram illustrating a first example of writing an image from the image processing unit 5 to the memory 2. The decoder 9 writes a produced decoded image 30 to the memory 2. The encoder 8 writes a produce local decoded image 30 to the memory 2.

Referring to FIG. 27, an image area 32 has already been written to the memory 2. Two image areas 35 above and on the left of a current macroblock 31 are filtered by a deblocking filter. An image area 33 is stored in a line buffer 7 for filtering. Two image areas 34 on the left of the image areas 35 have been filtered and are to be transferred to the memory 2 for write. The image areas 34 are 16 columns×8 rows each.

The present embodiment allows writing an image to the memory 2 with a transfer size smaller than the size of a packed word, (corresponding to 16 columns×8 rows of luminance). More specifically, if the current macroblock 31 is a frame image, the access controller 4 transfers top and bottom halves of a top-field packed word (i.e., corresponding to 16 columns×4 rows of luminance) of each image area 34 and top and bottom halves of the corresponding bottom-field packed word (similarly, corresponding to 16 columns×4 rows of luminance) from the image processing unit 5 to the memory 2. In short, four transfers corresponding to 16 columns×4 rows of luminance are performed for two image areas 34. Thereby two frame images each corresponding to 16 columns×8 rows of luminance are written to the memory 2 for the two image areas 34.

If the current macroblock 31 is a field image, the access controller 4 transfers top-field or bottom-field packed word (i.e., corresponding to 16 columns×8 rows of luminance) of each image area 34 from the image processing unit 5 to the memory 2. Thereby two field images each corresponding to 16 columns×8 rows of luminance are written to the memory 2 for two image areas 34.

Figure 28:
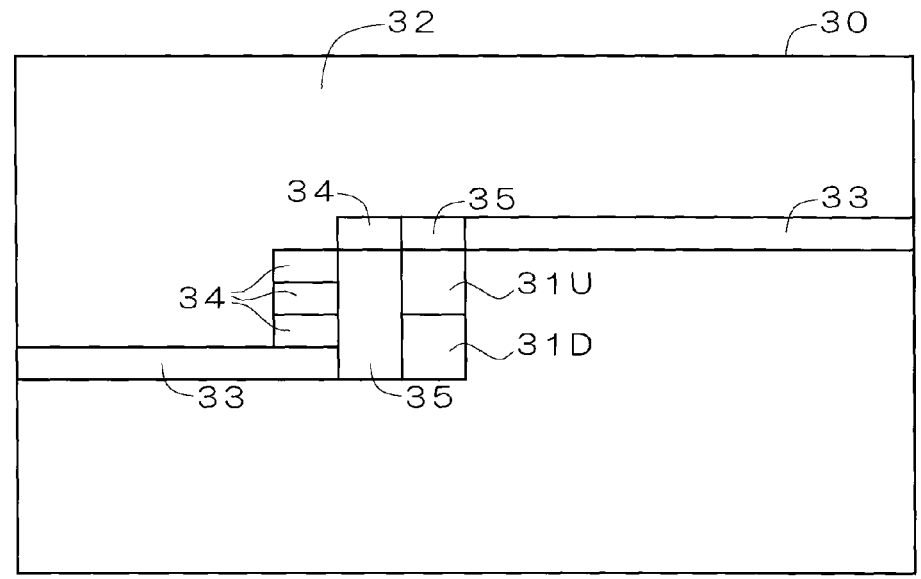
FIG. 28 is a diagram illustrating a second example of writing an image from the image processing unit to the memory.

FIG. 28 is a diagram illustrating a second example of writing an image from the image processing unit 5 to the memory 2. Also with a target being a macroblock pair, similar to the above, the decoder 9 writes a produced decoded image 30 to the memory 2, and the encoder 8 writes a produced local decoded image 30 to the memory 2.

Referring to FIG. 28, an image area 32 has already been written to the memory 2. Two image areas 35 above and on the left of current macroblocks 31U and 31D are filtered by a deblocking filter. An image area 33 is stored in a line buffer 7 for filtering. Four image areas 34 on the left of the image areas 35 have been filtered and are to be transferred to the memory 2 for write. The image areas 34 are 16 columns×8 rows each.

The access controller 4 transfers top and bottom halves of a top-field packed word (i.e., corresponding to 16 columns×4 rows of luminance) of each image area 34 and top and bottom halves of the corresponding bottom-field packed word (similarly, corresponding to 16 columns×4 rows of luminance) from the image processing unit 5 to the memory 2. In short, eight transfers corresponding to 16 columns×4 rows of luminance are performed for four image areas 34. Thereby four frame images each corresponding to 16 columns×8 rows of luminance are written to the memory 2 for the four image areas 34.

Figure 29:
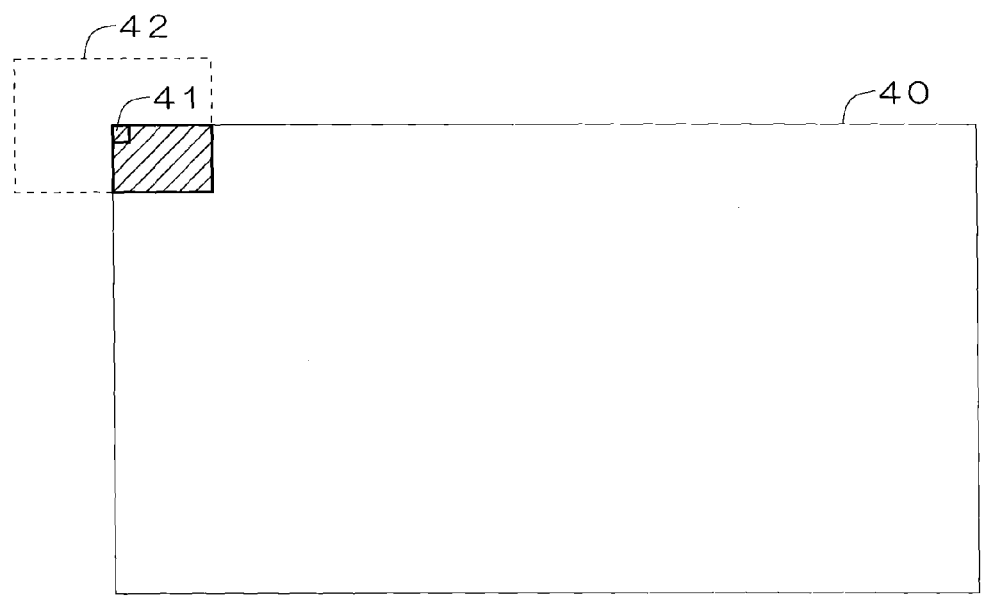
FIG. 29 is a diagram illustrating a first example of reading an image from the memory to the image processing unit.
Figure 30:
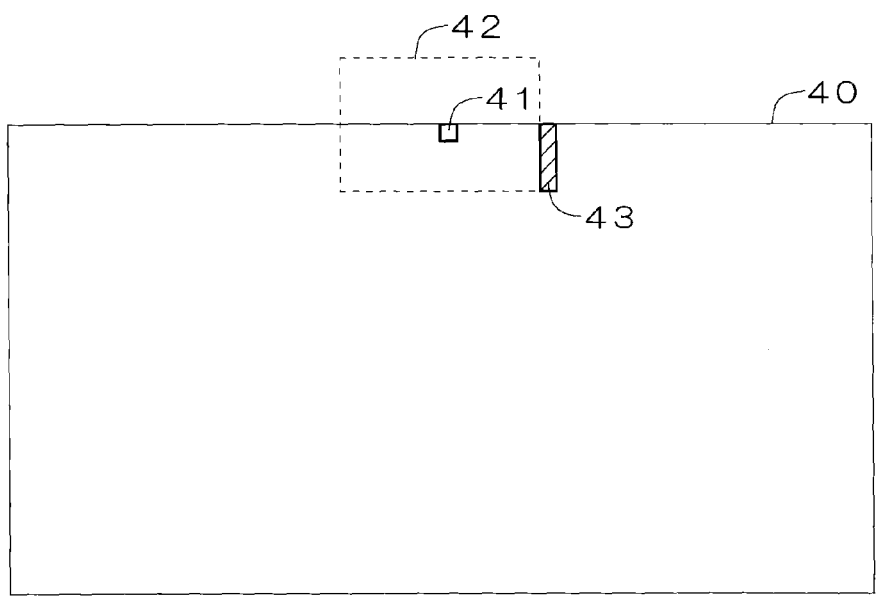
FIG. 30 is a diagram illustrating a first example of reading an image from the memory to the image processing unit.
Figure 31:
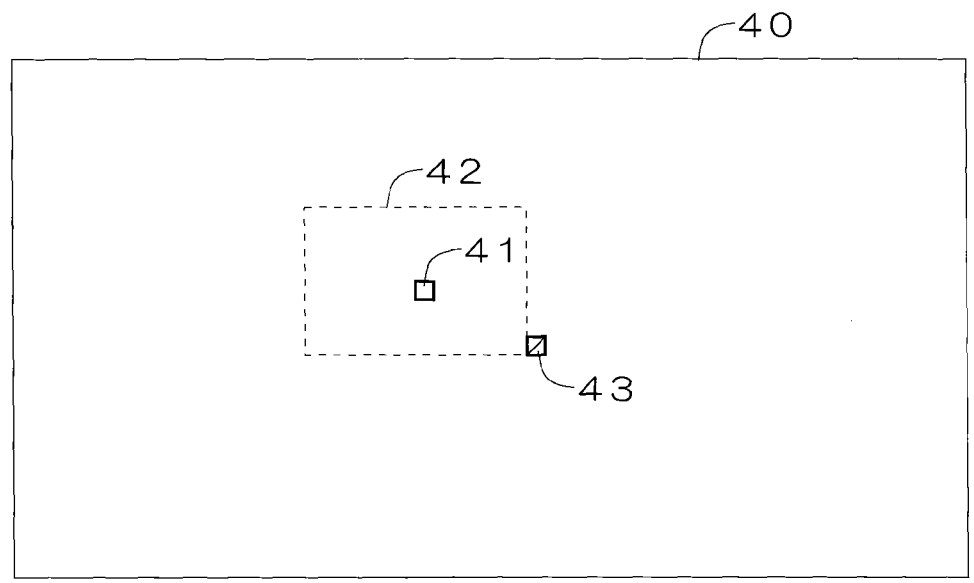
FIG. 31 is a diagram illustrating a first example of reading an image from the memory to the image processing unit.

FIGS. 29 to 31 are diagrams illustrating a first example of reading an image from the memory 2 to the image processing unit 5. The encoder 8 reads a reference image 40 to be used for motion search from the memory 2.

Referring to FIG. 29, a current macroblock 41 is located at the top-left corner of the reference image 40 when processing starts. Then the access controller 4 reads image data in a reading range (diagonally shaded image area)

where a search window 42 overlaps the reference image 40 from the memory 2 and writes the image data in the line buffer 7. For example, the packed words are read in order from the one in the leftmost column and top row in the reading range down to the one in the bottom row of the column, and reading downwards are repeated by shifting to the right by one column, so that all the packed words in the reading range are read.

Referring to FIG. 30, when the current macroblock 41 is located on the upper side of the reference image 40, the access controller 4 reads image data of an image area 43 in the reference image 40 and on the right side of the search window 42 from the memory 2 and write the image data in the line buffer 7. For example, the packed words are read in order from the one in the top row in the image area 43 down to the one in the bottom row.

Referring to FIG. 31, in a normal update when the current macroblock 41 is around the center of the reference image 40, the access controller 4 read image data of the image area 43 of one macroblock (corresponding to two packed words) on the bottom-right corner of the search window 42 from the memory 2 and write the image data in the line buffer 7.

FIGS. 32 to 40 are diagrams illustrating a second example of reading an image from the memory 2 to the image processing unit 5. The decoder 9 reads reference images 50 and 52 to be used for decoding by from the memory 2 by random access.

Figure 32A:
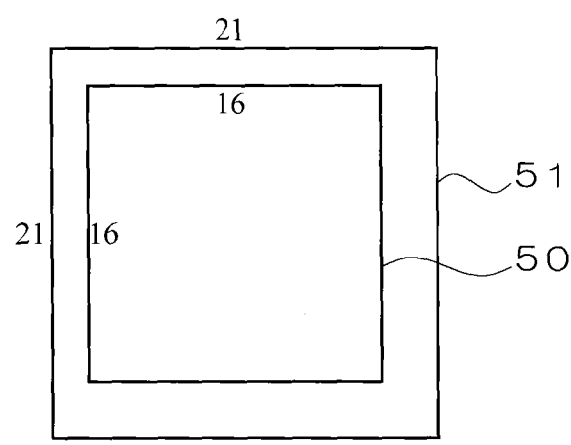
FIGS. 32A and 32B are diagrams illustrating a second example of reading an image from the memory to the image processing unit.
Figure 32B:
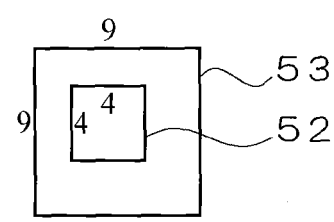

As illustrated in FIG. 32A, with the reference image 50 being a macroblock of 16 columns×16 rows, producing an image of ¼ pixel accuracy from an image of 16 columns×16 rows with a 6-tap filter requires an integer accuracy image area 51 of 21 columns×21 rows. As illustrated in FIG. 32B, with the reference image 52 being a block of 4 columns×4 rows, producing an image of ¼ pixel accuracy with a 6-tap filter from an image of 4 columns×4 rows requires an integer accuracy image area 53 of 9 columns×9 rows.

Figure 33:
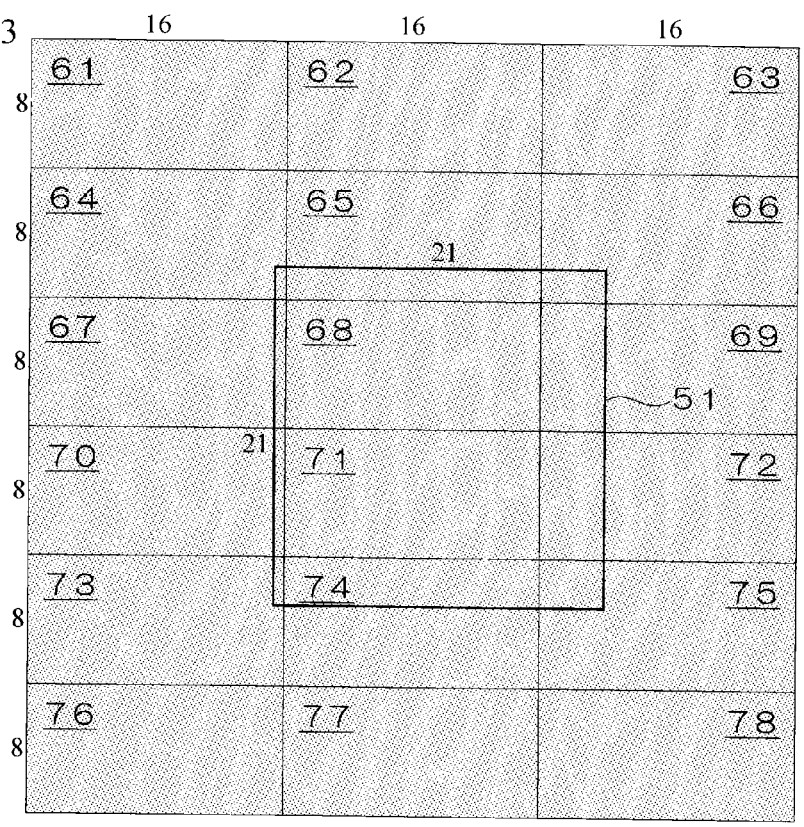
FIG. 33 is a diagram illustrating a second example of reading an image from the memory to the image processing unit.
Figure 34:
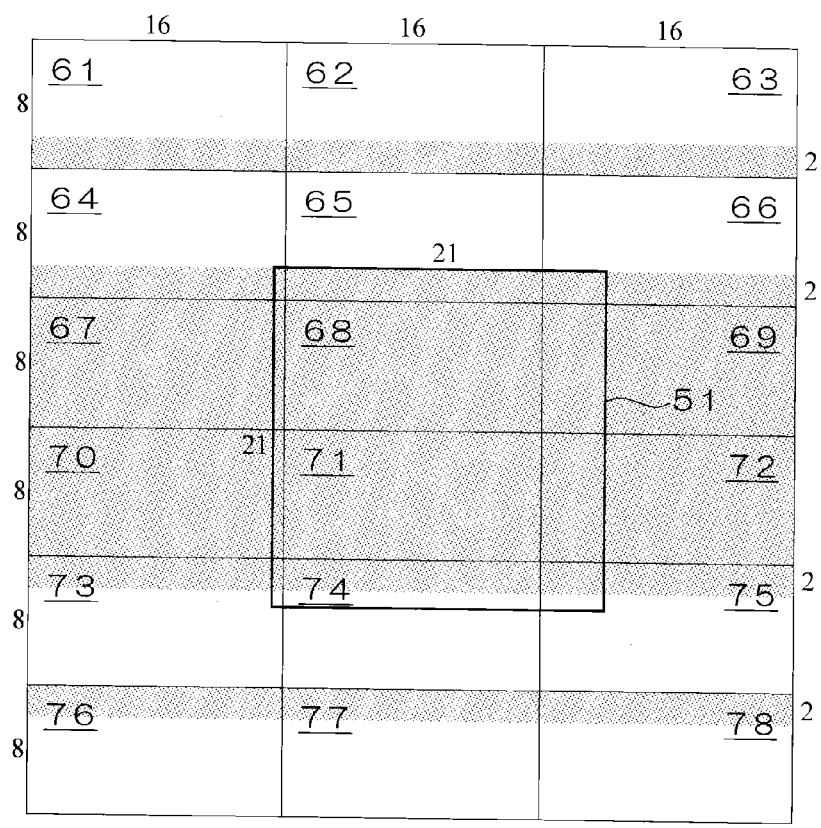
FIG. 34 is a diagram illustrating a second example of reading an image from the memory to the image processing unit.

FIGS. 33 and 34 illustrate an example of reading a frame image area 51 from the memory 2. In FIGS. 33 and 34, packed words 61 to 63, 67 to 69, and 73 to 75 are top-field packed words, and packed words 64 to 66, 70 to 72, and 76 to 78 are bottom-field packed words. Image areas to be read from the memory 2 are indicated by a sanded pattern.

In the example of FIG. 33, the access controller 4 reads all areas of the packed words 61, 64, 67, 70, 73, 76, 62, 65, 68, 71, 74, 77, 63, 66, 69, 72, 75, and 78 from the memory 2 in this order. In this example, an area of 21 columns×21 rows are extracted from the read image area of 48 columns×48 rows, so as to obtain the frame image area 51.

The present embodiment allows reading an image from the memory 2 with a transfer size (for example, corresponding to 16 columns×2 rows of luminance) smaller than the size of a packed word (corresponding to 16 columns×8 rows of luminance). Thus as illustrated in FIG. 34, reading image areas of upper 6 rows of each of the packed words 61 to 66 and lower 6 rows of each of the packed words 73 to 78 may be omitted. In this example, an area of 21 columns×21 rows are extracted from the read image area of 48 columns×24 rows, so as to obtain the frame image area 51.

Figure 35:
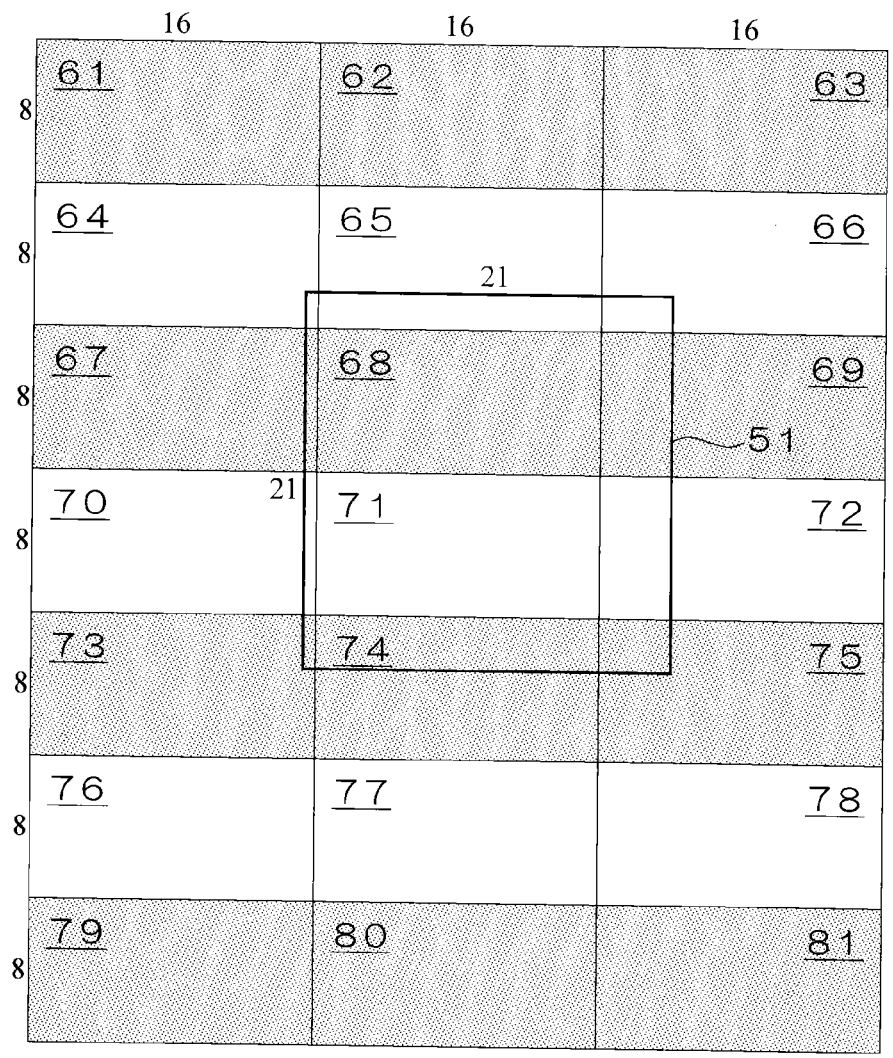
FIG. 35 is a diagram illustrating a second example of reading an image from the memory to the image processing unit.
Figure 36:
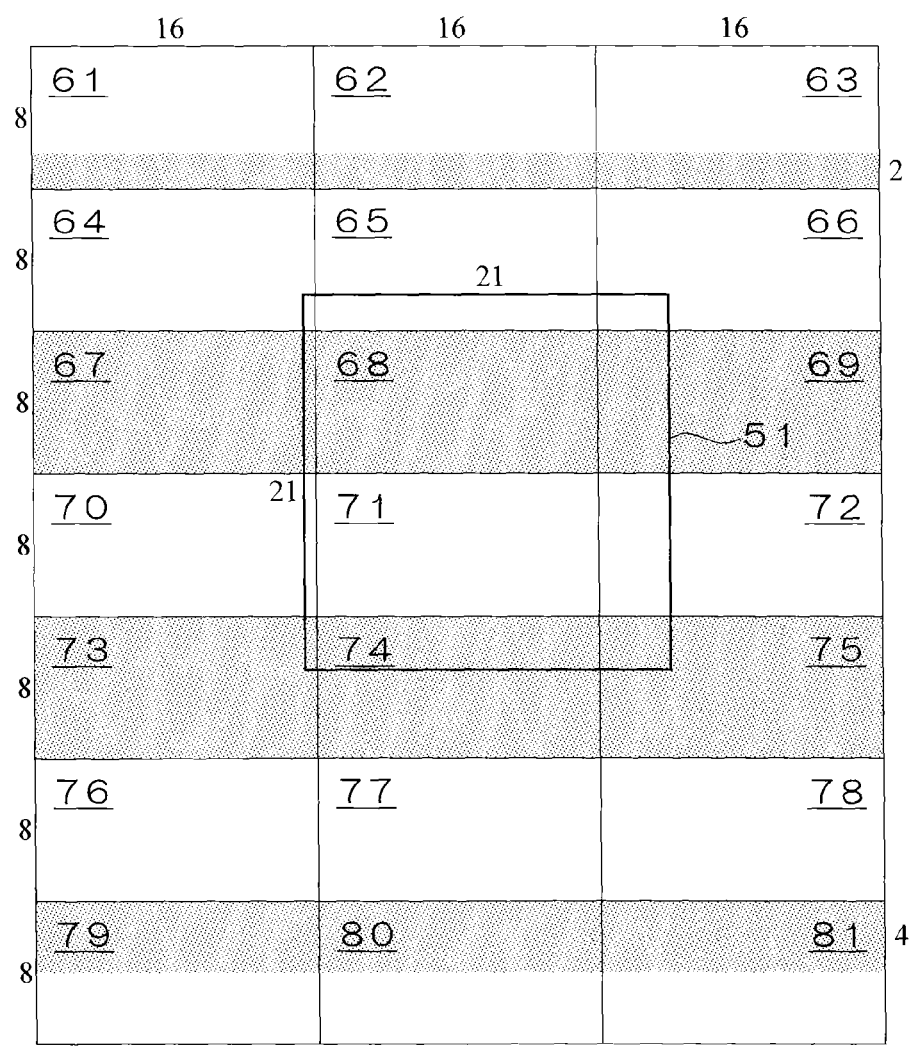
FIG. 36 is a diagram illustrating a second example of reading an image from the memory to the image processing unit.

FIGS. 35 and 36 illustrate an example of reading a top-field image area 51 from the memory 2. In FIGS. 35 and 36, packed words 61 to 63, 67 to 69, 73 to 75, and 79 to 81 are top-field packed words, and packed words 64 to 66, 70 to 72, and 76 to 78 are bottom-field packed words. Image areas to be read from the memory 2 are indicated by a sanded pattern.

In the example of FIG. 35, the access controller 4 reads all areas of the packed words 61, 67, 73, 79, 62, 68, 74, 80, 63, 69, 75, and 81 from the memory 2 in this order. In this example, an area of 21 columns×21 rows are extracted from the read image area of 48 columns×32 rows, so as to obtain the top-field image area 51.

The present embodiment allows reading an image from the memory 2 with a transfer size (for example, corresponding to 16 columns×2 rows of luminance) smaller than the size of a packed word (corresponding to 16 columns×8 rows of luminance). Thus as illustrated in FIG. 36, reading image areas of upper 6 rows of each of the packed words 61 to 63 and lower 4 rows of each of the packed words 79 to 81 may be omitted. In this example, an area of 21 columns×21 rows are extracted from the read image area of 48 columns×22 rows, so as to obtain the top-field image area 51.

Figure 37:
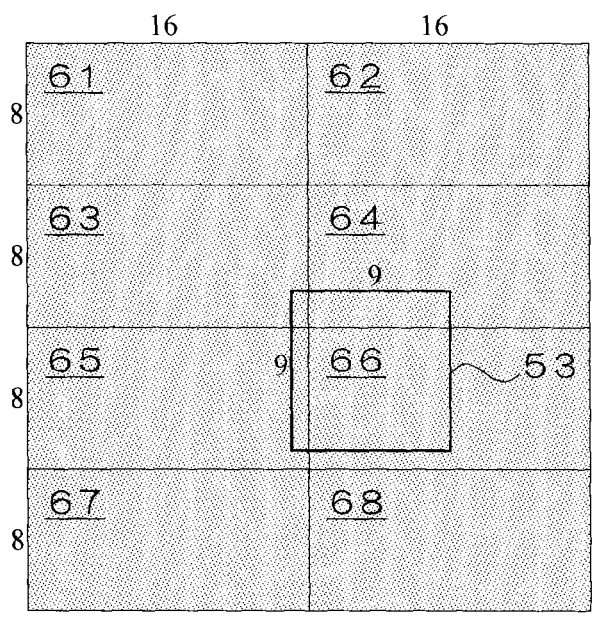
FIG. 37 is a diagram illustrating a second example of reading an image from the memory to the image processing unit.
Figure 38:
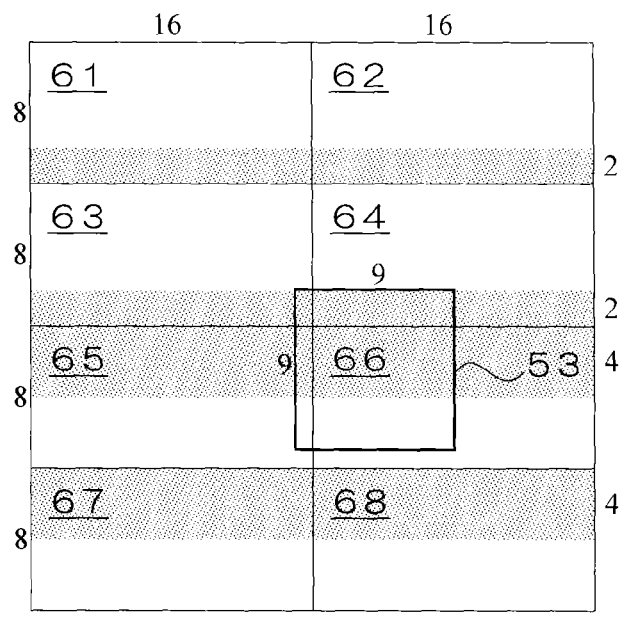
FIG. 38 is a diagram illustrating a second example of reading an image from the memory to the image processing unit.

FIGS. 37 and 38 illustrate an example of reading a frame image area 53 from the memory 2. In FIGS. 37 and 38, packed words 61, 62, 65, and 66 are top-field packed word, and packed words 63, 64, 67, and 68 are bottom-field packed words. Image areas to be read from the memory 2 are indicated by a sanded pattern.

In the example of FIG. 37, the access controller 4 reads all areas of the packed words 61, 63, 65, 67, 62, 64, 66, and 68 from the memory 2 in this order. In this example, an area of 9 columns×9 rows are extracted from the image area of 32 columns×32 rows, so as to obtain the frame image area 53.

The present embodiment allows reading an image from the memory 2 with a transfer size (for example, corresponding to 16 columns×2 rows of luminance) smaller than the size of a packed word (corresponding to 16 columns×8 rows of luminance). Thus as illustrated in FIG. 38, reading image areas of upper 6 rows of each of the packed words 61 to 64 and lower 4 rows of each of the packed words 65 to 68 may be omitted. In this example, an area of 9 columns×9 rows are extracted from the read image area of 32 columns×12 rows, so as to obtain the frame image area 53.

Figure 39:
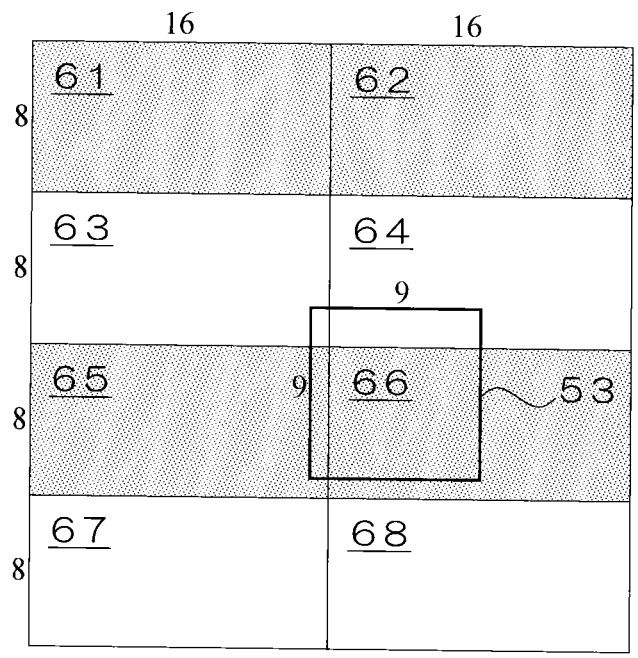
FIG. 39 is a diagram illustrating a second example of reading an image from the memory to the image processing unit.
Figure 40:
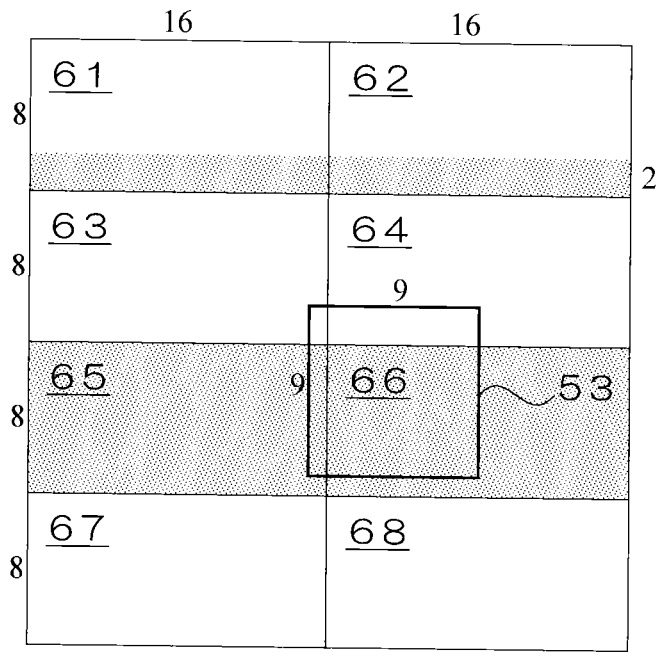
FIG. 40 is a diagram illustrating a second example of reading an image from the memory to the image processing unit.

FIGS. 39 and 40 illustrate an example of reading a top-field image area 53 from the memory 2. In FIGS. 39 and 40, packed words 61, 62, 65, and 66 are top-field packed word, and packed words 63, 64, 67, and 68 are bottom-field packed words. Image areas to be read from the memory 2 are indicated by a sanded pattern.

In the example of FIG. 39, the access controller 4 reads all areas of the packed words 61, 65, 62, and 66 from the memory 2 in this order. In this example, an area of 9 columns×9 rows are extracted from the read image area of 32 columns×16 rows, so as to obtain the top-field image area 53.

The present embodiment allows reading an image from the memory 2 with a transfer size (for example, corresponding to 16 columns×2 rows of luminance) smaller than the size of a packed word (corresponding to 16 columns×8 rows of luminance). Thus as illustrated in FIG. 40, reading image areas of upper 6 rows of each of the packed words 61 and 62 may be omitted. In this example, an area of 9 columns×9 rows are extracted from the read image area of 32 columns× 10 rows, so as to obtain the top-field image area 53.

As described above, in the image processor 1 according to the present embodiment, in storing an image in the memory 2, the access controller 4 splits the image in multiple packed words (groups of unit pixel data pieces) each including pixel data of multiple columns by multiple rows, and stores groups of unit pixel data pieces aligned in at least two columns in a pixel space in the same Row (unit storage areas) in the same memory bank. Thus in reading multiple groups of unit pixel data pieces from the memory 2 in a direction of columns (horizontally) in order, at least two groups of unit pixel data pieces stored in the same unit storage area in the same memory bank can be read successively without switching memory banks or switching unit storage areas. Furthermore, in reading multiple pixel data pieces from the memory 2 in a direction of rows (vertically) in order, multiple rows of pixel data included in each group of unit pixel data pieces can be read successively without switching memory banks or switching unit storage areas.

In the image processor 1 according to the present embodiment, the access controller 4 stores at least four groups of unit pixel data pieces aligned in at least two columns by at least two rows in a pixel space in the same unit storage area in the same memory bank. Thus in reading multiple groups of unit pixel data pieces from the memory 2 in a direction of row (vertically) in order, at least two groups of unit pixel data pieces stored in the same unit storage area in the same memory bank can be read successively without switching memory banks or switching unit storage areas.

In the image processor 1 according to the present embodiment, in reading a desired image area from the memory 2, the access controller 4 reads multiple groups of unit pixel data pieces included in the image area without successive access to different unit storage areas in the same memory bank. Avoiding successive access to different unit storage areas in the same memory bank prevents latency due to precharge, achieving reduction in time required for a read.

In the image processor 1 according to the present embodiment, in reading a desired image area from the memory 2, the access controller 4 reads multiple groups of unit pixel data pieces included in the image area by successive access to the same unit storage area in the same memory bank. Successive access to the same unit storage area in the same memory bank requires no repeated precharge, achieving prevention of latency due to precharge.

In the image processor 1 according to the present embodiment, in reading a desired image area from the memory 3, the access controller 4 reads multiple groups of unit pixel data pieces included in the image area by successive access to different memory banks. During access to a certain memory bank, precharge of a subsequent memory banks can be performed, which prevents latency due to precharge.

In the image processor 1 according to the present embodiment, the access controller 4 splits a macroblock in a top-field packed word (first group of unit pixel data pieces) collectively including pixel data of even-numbered rows in the macroblock and a bottom-field packed word (second group of unit pixel data pieces) collectively including pixel data of odd-numbered rows in the macroblock. Thus reading both first and second groups of unit pixel data pieces realizes reading a frame image from the memory 2 to the image processing unit 5, and reading either one of first and second groups of unit pixel data pieces realizes reading a field image from the memory 2 to the image processing unit 5.

In the image processor 1 according to the present embodiment, the access controller 4 splits a macroblock pair in a first group of unit pixel data pieces collectively including pixel data of even-numbered rows in an up macroblock, a second group of unit pixel data pieces collectively including pixel data of odd-numbered rows in the up macroblock, a third group of unit pixel data pieces collectively including pixel data of even-numbered rows in a down macroblock, and a fourth group of unit pixel data pieces collectively including pixel data of odd-numbered rows in the down macroblock. Thus reading all of the first to fourth groups of unit pixel data pieces realizes reading a frame image of a macroblock pair from the memory 2 to the image processing unit 5, and reading either first and third groups of unit pixel data pieces or second and fourth groups of unit pixel data pieces realizes reading a field image of a macroblock pair from the memory 2 to the image processing unit 5.

In the image processor 1 according to the present embodiment, a group of unit pixel data pieces includes both luminance and chrominance data. Thus in comparison with luminance and chrominance data stored in different memory banks, reading corresponding luminance and chrominance data is facilitated.

In the image processor 1 according to the present embodiment, the access controller 4 allows writing an image to the memory 2 with a transfer size equal to a size of a group of unit pixel data pieces. With a transfer size equal to the size of a group of unit pixel data pieces, the group of unit pixel data pieces is written from the image processing unit 5 to the memory 2 by one data transfer.

In the image processor 1 according to the present embodiment, the access controller 4 allows writing an image to the memory 2 with a transfer size smaller than the size of a group of unit pixel data pieces. With a transfer size smaller than the size of a group of unit pixel data pieces, the group of unit pixel data pieces is written from the image processing unit 5 to the memory 2 by multiple data transfers.

In the image processor 1 according to the present embodiment, the access controller 4 allows reading an image from the memory 2 with a transfer size equal to the size of a group of unit pixel data pieces. With a transfer size equal to the size of the group of unit pixel data pieces, the group of unit pixel data pieces is read from the memory 2 to the image processing unit 5 by one data transfer.

In the image processor 1 according to the present embodiment, the access controller 4 allows reading an image from the memory 2 with a transfer size smaller than the size of a group of unit pixel data pieces. With a transfer size smaller than the size of the group of unit pixel data pieces, unnecessary data transfer from the memory 2 to the image processing unit 5 is prevented.

In the image processor 1 according to the present embodiment, the address setting unit 6 sets a memory bank for storing each group of unit pixel data pieces among multiple memory banks of the memory 2, based on a positional coordinate of the group of unit pixel data pieces in a pixel space. Thus each group of unit pixel data pieces is stored in an appropriate memory bank.

In the image processor 1 according to the present embodiment, the address setting unit 6 sets an address of an image having a horizontal size that is not a power of 2, with an arithmetic model corresponding to an image having a horizontal size that is a power of 2. Thus in arithmetically setting a physical address for storing each group of unit pixel data pieces in the memory 2, no multiplier is required, achieving reduction in circuit size of an arithmetic circuit.

While the invention has been described in detail, the foregoing description is in all aspects illustrative and not restrictive. It is therefore understood that numerous modifications and variations can be devised without departing from the scope.

EXPLANATION OF REFERENCE NUMERALS 1 image processor
2 memory
4 access controller
5 image processing unit
6 address generation unit

The invention claimed is:
1. An image processor comprising:
circuitry configured to:

hold an image by a memory of the circuitry and the memory including a plurality of memory banks each including a plurality of unit storage areas;

process an image; and control an access by an access controller of the circuitry to the memory, wherein in storing an image in the memory, the access controller splits the image in a plurality of groups of unit pixel data pieces each including pixel data of a plurality of columns by a plurality of rows and stores at least four groups of unit pixel data pieces aligned in at least two columns by at least two rows in a pixel space in an identical unit storage area in an identical memory bank.

2. The image processor according to claim 1, wherein in reading a desired image area from the memory, the access controller reads a plurality of groups of unit pixel data pieces included in the image area without successive access to a different unit storage area in an identical memory bank.

3. The image processor according to claim 2, wherein in reading the desired image area from the memory, the access controller reads a plurality of groups of unit pixel data pieces included in the desired image area by successive access to an identical unit storage area in an identical memory bank.

4. The image processor according to claim 2, wherein in reading the desired image area from the memory, the access controller reads a plurality of groups of unit pixel data pieces included in the desired image area by successive access to a different memory bank.

5. The image processor according to claim 1, wherein in storing a macroblock in the memory, the access controller splits the macroblock in a first group of unit pixel data pieces collectively including pixel data of even-numbered rows in the macroblock and a second group of unit pixel data pieces collectively including pixel data of odd-numbered rows in the macroblock.

6. The image processor according to claim 1, wherein in storing a macroblock pair including a first and second macroblocks in the memory, the access controller splits the macroblock pair in a first group of unit pixel data pieces collectively including pixel data of even-numbered rows in the first macroblock, a second group of unit pixel data pieces collectively including pixel data of odd-numbered rows in the first macroblock, a third group of unit pixel data pieces collectively including pixel data of even-numbered rows in the second macroblock, and a fourth group of unit pixel data pieces collectively including pixel data of odd-numbered rows in the second macroblock.

7. The image processor according to claim 1, wherein the group of unit pixel data pieces include both luminance and chrominance data.

8. The image processor according to claim 1, wherein in writing an image to the memory, the access controller allows writing the image with a transfer size equal to a size of the group of unit pixel data pieces.

9. The image processor according to claim 1, wherein in writing an image to the memory, the access controller allows writing the image with a transfer size smaller than a size of the group of unit pixel data pieces.

10. The image processor according to claim 1, wherein in reading an image from the memory, the access controller allows reading the image with a transfer size equal to a size of the group of unit pixel data pieces.

11. The image processor according to claim 1, wherein in reading an image from the memory, the access controller allows reading the image with a transfer size smaller than a size of the group of unit pixel data pieces.

12. The image processor according to claim 1, wherein the access controller configured to set a memory bank for storing each group of unit pixel data pieces among a plurality of memory banks of the memory, based on a positional coordinate of the group of unit pixel data pieces in a pixel space.

13. The image processor according to claim 12, wherein the access controller sets an address of an image having a horizontal size that is not a power of 2, with an arithmetic model corresponding to an image having a horizontal size that is a power of 2.

14. A method for memory access control, comprising:

processing an image by circuitry;

controlling an access to a memory of the circuitry configured to hold the image and the memory including a plurality of memory banks each having a plurality of unit storage areas;

in storing the image in the memory, splitting the image into a plurality of groups of unit pixel data pieces each including pixel data of a plurality of columns by a plurality of rows, and storing at least four groups of unit pixel data pieces aligned in at least two columns by at least two rows in a pixel space in an identical unit storage area in an identical memory bank.

* * * * *